US010204409B2

(12) United States Patent
Lee et al.

(10) Patent No.: US 10,204,409 B2
(45) Date of Patent: Feb. 12, 2019

(54) APPARATUS AND METHOD OF PROCESSING MEDICAL IMAGE

(71) Applicant: Samsung Electronics Co., Ltd., Gyeonggi-do (KR)

(72) Inventors: Gun-woo Lee, Seoul (KR); Sang-wook Yoo, Suwon-si (KR); Jong-hyon Yi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 15/173,522

(22) Filed: Jun. 3, 2016

(65) Prior Publication Data
US 2016/0358333 A1  Dec. 8, 2016

(30) Foreign Application Priority Data

Jun. 4, 2015 (KR) .................. 10-2015-0079405

(51) Int. Cl.
*G06K 9/00* (2006.01)
*G06T 7/00* (2017.01)
(Continued)

(52) U.S. Cl.
CPC ............ *G06T 7/0012* (2013.01); *G06T 7/11* (2017.01); *G06T 11/60* (2013.01); *G06T 2207/10081* (2013.01); *G06T 2207/30101* (2013.01)

(58) Field of Classification Search
None
See application file for complete search history.

(56) References Cited

U.S. PATENT DOCUMENTS 7,940,974 B2 * 5/2011 Skinner .................. G06K 9/34
                                                          382/131
8,654,139 B2 * 2/2014 Jakobovits ............ G06F 19/321
                                                          345/581
(Continued)

FOREIGN PATENT DOCUMENTS

JP    2007-511268    5/2007
JP    2008-126070    6/2008
(Continued)

OTHER PUBLICATIONS

The International Searching Authority, "Notification of Transmittal of the International Search Report and the Written Opinion of The International Searching Authority, or The Declaration," International Application No. PCT/KR2016/005912, dated Sep. 23, 2016, 11 pages, publisher The ISA/KR, International Application Division, Korean Intellectual Property Office, Daejeon, Republic of Korea.

(Continued)

*Primary Examiner* — Nancy Bitar

(57) ABSTRACT

Provided is a medical image processing apparatus and method. The medical image processing apparatus includes: an image processor configured to extract a blood vessel area and at least one contour line of the blood vessel area from a first image representing the blood vessel area, and to obtain a second image representing an area of at least one plaque based on the blood vessel area and the at least one contour line; a display configured to display the second image; and a user interface configured to receive a user input for correcting at least one contour line corresponding to at least one of the at least one plaque represented in the second image, wherein the image processor corrects the second image based on the user input. The medical image process- (Continued)

ing apparatus may precisely visualize a contour line of the blood vessel area.

17 Claims, 18 Drawing Sheets

(51) Int. Cl.
*G06T 11/60* (2006.01)
*G06T 7/11* (2017.01)

(56) References Cited

U.S. PATENT DOCUMENTS

| | | | |
|---|---|---|---|
| 9,304,982 B2* | 4/2016 | Grady | G06T 19/00 |
| 2007/0133849 A1* | 6/2007 | Young | G06T 15/08 |
| | | | 382/128 |
| 2008/0118131 A1* | 5/2008 | Skinner | G06T 7/0012 |
| | | | 382/131 |
| 2008/0137926 A1 | 6/2008 | Skinner et al. | |
| 2010/0061610 A1* | 3/2010 | Van De Haar | G01N 23/046 |
| | | | 382/131 |
| 2010/0092053 A1 | 4/2010 | Takahiro et al. | |
| 2010/0239146 A1 | 9/2010 | Tatsuro | |
| 2011/0206247 A1* | 8/2011 | Dachille | G06T 11/001 |
| | | | 382/128 |
| 2012/0075638 A1* | 3/2012 | Rollins | A61B 1/00009 |
| | | | 356/479 |
| 2012/0226141 A1 | 9/2012 | Shinoda et al. | |
| 2012/0243760 A1* | 9/2012 | Manabe | G06T 7/0012 |
| | | | 382/131 |
| 2013/0066197 A1 | 3/2013 | Pruvot et al. | |
| 2015/0089337 A1 | 3/2015 | Grady et al. | |

FOREIGN PATENT DOCUMENTS

| | | |
|---|---|---|
| JP | 2010-088795 | 4/2010 |
| JP | 2010-240387 | 10/2010 |
| JP | 2013-059620 | 4/2013 |
| KR | 2011-0077795 | 4/2012 |
| WO | WO 2011-037853 | 3/2011 |

OTHER PUBLICATIONS

J. Olivan Bescos et al., "Vessel Explorer: a tool for quantitative measurements in CT and MR angiography", Medicamundi, Jan. 1, 2009, 8 pages.
Supplementary European Search Report dated Apr. 26, 2018 in connection with European Patent Application No. 16 80 3770.

* cited by examiner

1110

1010

1020

1030

1040

1060

1050

1120

APPARATUS AND METHOD OF PROCESSING MEDICAL IMAGE

CROSS-REFERENCE TO RELATED APPLICATION(S) AND CLAIM OF PRIORITY

The present application is related to and claims the benefit under 35 U.S.C. § 119(a) of a Korean Patent Application No. 10-2015-0079405, filed on Jun. 4, 2015, in the Korean Intellectual Property Office, the disclosure of which is incorporated herein in its entirety by reference.

TECHNICAL FIELD

The present application relates generally to methods and apparatuses for processing medical images, more specifically, to methods and apparatuses for processing images of blood vessels.

BACKGROUND

Medical image processing apparatuses are used for acquiring images of internal structures of an object. Medical image processing apparatuses are non-invasive examination apparatuses that show structural details, internal tissues, and fluid flow of a human body. A user, such as a doctor, may examine a health state and diagnose a disease of a patient by using a medical image output by a medical image processing apparatus. Examples of such apparatuses may include magnetic resonance imaging (MRI) apparatuses, computed tomography (CT) apparatuses, X-ray apparatuses, and ultrasound apparatuses, and medical image processing apparatuses generate medical images by using captured image data.

CT apparatuses provide a cross-sectional image of an object and visualize the internal structures (e.g., organs such as a kidney, a lung, etc.) of the object in such a manner that the internal structures do not overlap each other unlike in the case of general X-ray apparatuses.

In order to diagnose blood vessel-related diseases such as coronary stenosis, cardiovascular diseases, and the like, contours of blood vessels need to be visualized precisely in images. Therefore, methods and apparatuses for processing medical images, which are capable of precisely extracting and representing contours of blood vessels, are necessary.

SUMMARY

To address the above-discussed deficiencies, it is a primary object to provide methods and apparatuses for processing medical images, capable of representing precise contours of blood vessels for diagnosing diseases around blood vessels and provide methods and apparatuses for processing medical images, capable of accurately diagnosing diseases of coronary arteries in a computed tomography (CT) image.

Additional aspects will be set forth in part in the description which follows and, in part, will be apparent from the description, or may be learned by practice of the presented embodiments.

According to an aspect of an embodiment, a medical image processing apparatus includes an image processor configured to extract a blood vessel area and at least one contour line of the blood vessel area from a first image representing the blood vessel area, and to obtain a second image representing an area of at least one plaque based on the blood vessel area and the at least one contour line; a display configured to display the second image; and a user interface configured to receive a user input for correcting at least one contour line corresponding to at least one of the at least one plaque represented in the second image, wherein the image processor is further configured to correct the second image based on the user input.

The display may be further configured to display the corrected second image.

The image processor may be further configured to obtain the second image representing the area of the at least one plaque by detecting the at least one plaque based on the blood vessel area and the at least one contour line and label the at least one plaque that is detected.

The image processor may be further configured to label by using at least one of a maximum intensity projection and a minimum intensity projection.

The user interface may be further configured to receive an input for selecting first plaque from among the at least one plaque, and the second image may represent a view of the first plaque according to a criterion set in advance.

The criterion that is set in advance may be that the area of the first plaque is a maximum depth of the first plaque or a maximum area of the first plaque.

The second image may be at least one of an enlarged image of an image corresponding to the view of the first plaque and a cross-sectional image corresponding to the view of the first plaque.

The cross-sectional image corresponding to the view of the first plaque may include at least one of a cross-sectional image of a normal blood vessel area adjacent to the area of the first plaque, a cross-sectional image in which the area of the first plaque may be set to be the maximum depth or the maximum area, or a cross-sectional image adjacent to the cross-sectional image in which the area of the first plaque may be set to be the maximum depth or the maximum area.

The second image may represent a second view of the first plaque that has moved based on a first view of the first plaque.

The second image may include a plurality of images corresponding to the first plaque, the user interface may be further configured to receive a first input of a user for correcting the at least one contour line in a first image of the first plaque, from among the plurality of images, the image processor may be further configured to correct the first image of the first plaque based on the first input of the user, and the display may be further configured to display the first image of the plaque, wherein the first image has been corrected.

The image processor may be further configured to correct the plurality of images that are different from the first image of the first plaque based on the first input of the user, and the display may be further configured to display the plurality of images that have been corrected.

The medical image processing apparatus may further include a communicator configured to transmit the second image that has been corrected to a medical storage device or a medical device.

The extracted blood vessel area and the at least one contour line of the blood vessel area may be visualized by performing curved planar reformation (CPR) or straightened curved planar reformation (SCPR).

The blood vessel may be a coronary artery, and the at least one contour line may be a lumen contour line or a vessel wall contour line of the coronary artery.

The first image may be a three-dimensional (3D) computed tomography (CT) image.

The first image may include a CT image that is obtained through CT imaging after injecting a contrast medium into an object.

According to an aspect of another embodiment, a medical image processing apparatus includes an image processor configured to extract a center line of a blood vessel from a first image representing a blood vessel area and to generate a plurality of images corresponding to a plurality of views with respect to the blood vessel area based on the center line of the blood vessel; a display configured to display the plurality of images; and a user interface configured to receive a first input for correcting the blood vessel area in a first view image corresponding to a first view, from among the plurality of images, wherein the image processor is further configured to correct the first view image based on the first input, and correct at least one image, except the first view image, from among the plurality of images based on a result of correcting the first view image.

The display may be further configured to display the at least one image that has been corrected.

The user interface may be further configured to receive a second input for correcting the blood vessel area in a second view image from among the plurality of images, and the image processor may be further configured to correct the second view image based on the second input and correct at least one image, except the first view image and the second view image, from among the plurality of images based on a result of correcting the second view image.

The display may be further configured to display the first view image that has been corrected based on the first input and the plurality of images that have been corrected based on the second input.

The user interface may be further configured to receive the first input for correcting the at least one contour line of the blood vessel area included in the first view image.

The blood vessel may be a coronary artery, and the at least one contour line may include a lumen contour line or a vessel wall contour line of the coronary artery.

The first image may be a three-dimensional (3D) computed tomography (CT) image.

The image processor may be further configured to correct at least one image, except the first view image, from among the plurality of images by using at least one of a Hounsfield unit (HU) value or a HU gradient at a location that has been corrected in the first view image.

The display may be further configured to display a corrected part to be distinguished from a part before being corrected in each of the plurality of images.

The user interface may be further configured to receive at least one of an input for approving the corrected part and an input for correcting the corrected part.

The display may be further configured to display the plurality of images, to which at least one of the input for approving the corrected part and the input for correcting the corrected part is applied.

According to an aspect of another embodiment, a medical image processing method includes extracting a blood vessel area and at least one contour line of the blood vessel area from a first image representing the blood vessel area; obtaining a second image representing an area of at least one plaque based on the blood vessel area and the at least one contour line; displaying the second image; receiving a user input for correcting the at least one contour line corresponding to at least one of the area of the at least one plaque represented in the second image; and correcting the second image based on the user input.

The medical image processing method may further include displaying the corrected second image.

The obtaining of the second image may include detecting the at least one plaque based on the blood vessel area and the at least one contour line; and obtaining the second image representing the area of the at least one plaque by performing labelling on the at least one plaque.

The displaying of the second image may further include receiving an input for selecting first plaque from among the at least one plaque, and the second image may visualize a view of the first plaque according to a criterion set in advance.

The criterion that is set in advance may be that the area of the first plaque is a maximum depth of the first plaque or a maximum area of the first plaque.

The second image may be at least one of an enlarged image of an image corresponding to the view of the first plaque and a cross-sectional image corresponding to the view of the first plaque.

The cross-sectional image corresponding to the view of the first plaque may include at least one of a cross-sectional image of a normal blood vessel area adjacent to the area of the first plaque, a cross-sectional image in which the area of the first plaque may be set to be the maximum depth or the maximum area, or a cross-sectional image adjacent to the cross-sectional image in which the area of the first plaque may be set to be the maximum depth or the maximum area.

The second image may include a plurality of images corresponding to the first plaque, and the receiving of the user input for correcting the contour line of the blood vessel area in the second image may include receiving a first input of a user for correcting the at least one contour line in the first image of the first plaque from among the plurality of images, and the medical image processing method may further include correcting the first image of the first plaque based on the first input of the user and displaying the first image of the first plaque that has been corrected.

The medical image processing method may further include correcting the plurality of images that are different from the first image of the first plaque based on the first input of the user and displaying the plurality of images that have been corrected.

The medical image processing method may further include transmitting the second image that has been corrected to a medical storage device or a medical device.

The blood vessel may be a coronary artery, and the at least one contour line may be a lumen contour line or a vessel wall contour line of the coronary artery.

According to an aspect of another embodiment, a medical image processing method includes extracting a center line of a blood vessel from a first image representing a blood vessel area; displaying a plurality of images corresponding to a plurality of views with respect to the blood vessel area based on the center line of the blood vessel; receiving a first input for correcting the blood vessel area with respect to a first view image corresponding to a first view, from among the plurality of images; and correcting the first view image based on the first input, and correcting at least one image, except the first view image, from among the plurality of images based on a result of correcting the first view image.

The medical image processing method may further include displaying the at least one image that has been corrected.

The medical image processing method may further include receiving a second input for correcting the blood vessel area with respect to a second view image from among the plurality of images; and correcting the second view images based on the second input, and correcting images except the first view image and the second view image, from among the plurality of images, based on a result of correcting the second view image.

The medical image processing method may further include displaying the first view image corrected based on the first input and the plurality of images corrected based on the second input.

The receiving of the first input for correcting the blood vessel area with respect to the first view image from among the plurality of images may include receiving the first input for correcting at least one contour line of the blood vessel area included in the first view image.

The blood vessel may be a coronary artery, and the at least one contour line may include a lumen contour line or a vessel wall contour line of the coronary artery.

The first image may be a three-dimensional (3D) computed tomography (CT) image, and the correcting of the plurality of images based on the result of correcting the first view image may include correcting at least one image, except the first view image, from among the plurality of images by using at least one of a Hounsfield unit (HU) value or a HU gradient at a location that has been corrected in the first view image.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
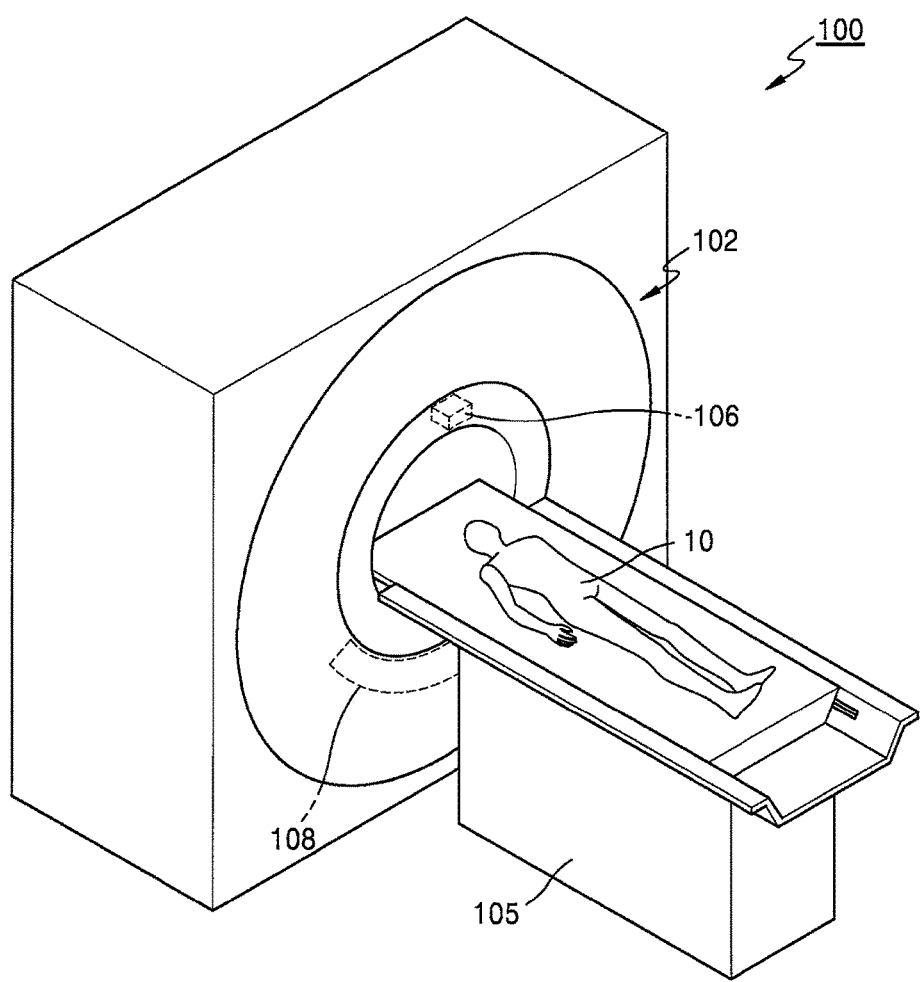
FIG. 1 illustrates a schematic diagram of a general computed tomography (CT) system related to an embodiment.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged CT system.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

When a part "includes" or "comprises" an element, unless there is a particular description contrary thereto, the part can further include other elements, not excluding the other elements. Also, the term "unit" in the embodiments of the present disclosure means a software component or hardware component such as a field-programmable gate array (FPGA)

or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Reference will now be made in detail to embodiments, examples of which are illustrated in the accompanying drawings. In this regard, the present embodiments may have different forms and should not be construed as being limited to the descriptions set forth herein. In the following description, well-known functions or constructions are not described in detail so as not to obscure the embodiments with unnecessary detail.

Throughout the specification, an "image" may mean multi-dimensional data formed of discrete image elements, e.g., pixels in a two-dimensional (2D) image and voxels in a three-dimensional (3D) image. For example, the image may include a medical image of an object which is captured by a computed tomography (CT) imaging apparatus.

Throughout the specification, a "CT image" may mean an image generated by synthesizing a plurality of X-ray images that are obtained by photographing an object while a CT imaging apparatus rotates around at least one axis with respect to the object.

Throughout the specification, an "object" may be a human, an animal, or a portion of a human or animal. For example, the object may be an organ (e.g., the liver, heart, womb, brain, breast, or abdomen), a blood vessel, or a combination thereof. Also, the object may be a phantom. The phantom means a material having a density, an effective atomic number, and a volume that are approximately the same as those of an organism. For example, the phantom may be a spherical phantom having properties similar to the physical body.

Throughout the specification, a "user" may be, but is not limited to, a medical expert including a medical doctor, a nurse, a medical laboratory technologist, a medial image expert, or a technician who repairs a medical apparatus.

Since a CT system is capable of providing a cross-sectional image of an object, the CT system may distinctively express an inner structure, e.g., an organ such as a kidney or a lung, of the object, compared to a general X-ray imaging apparatus.

The CT system may obtain a plurality of pieces of image data with a thickness not more than 2 mm several hundred times per second and then may process the plurality of pieces of image data, so that the CT system may provide a relatively accurate cross-sectional image of the object. According to the related art, only a horizontal cross-sectional image of the object can be obtained, but this issue has been overcome due to various image reconstruction methods. Examples of 3D image reconstruction methods are as below:

Shade surface display (SSD)—an initial 3D imaging method of displaying only voxels having a predetermined Hounsfield unit (HU) value.

Maximum intensity projection (MIP)/minimum intensity projection (MinIP)—a 3D imaging method of displaying only voxels having the greatest or smallest HU value from among voxels that construct an image.

Volume rendering (VR)—an imaging method capable of adjusting a color and transmittance of voxels that constitute an image, according to areas of interest.

Virtual endoscopy—a method that allows endoscopy observation in a 3D image that is reconstructed by using the VR method or the SSD method.

Multi-planar reformation (MPR)—a method of reconstructing an image into a different cross-sectional image. A user may reconstruct an image in any desired direction.

Editing—a method of editing adjacent voxels so as to allow a user to easily observe an area of interest in volume rendering.

Voxel of interest (VOI)—a method of displaying only a selected area in volume rendering.

A CT system 100 according to an embodiment of the present disclosure will now be described with reference to FIGS. 1 and 2. The CT system 100 may include various types of devices.

FIG. 1 schematically illustrates the CT system 100. Referring to FIG. 1, the CT system 100 may include a gantry 102, a table 105, an X-ray generating unit 106, and an X-ray detecting unit 108.

The gantry 102 may include the X-ray generating unit 106 and the X-ray detecting unit 108.

An object 10 may be positioned on the table 105.

The table 105 may move in a predetermined direction (e.g., at least one of up, down, right, and left directions) during a CT imaging procedure. Also, the table 105 may tilt or rotate by a predetermined angle in a predetermined direction.

The gantry 102 may also tilt by a predetermined angle in a predetermined direction.

Figure 2:
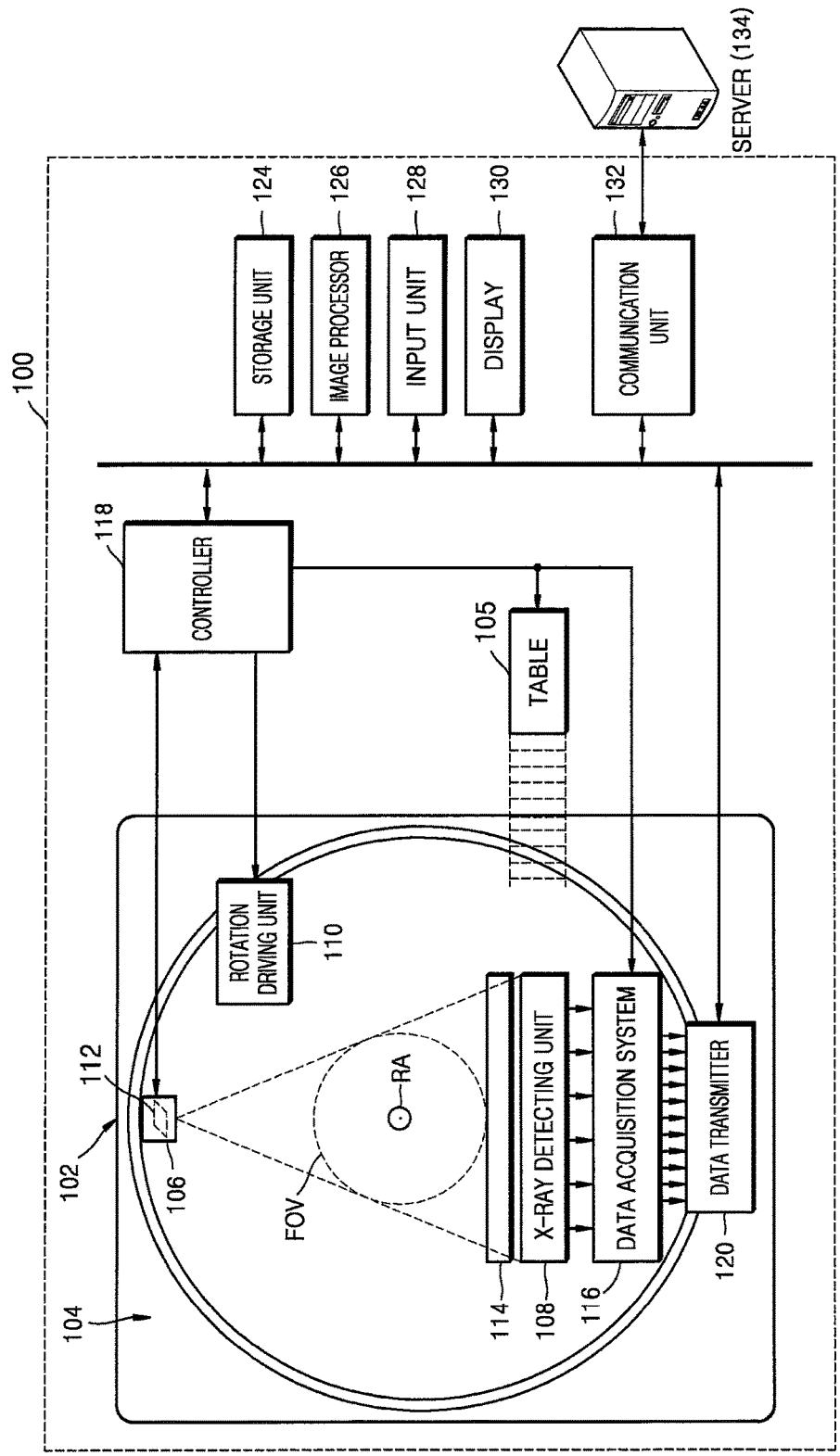
FIG. 2 illustrates a schematic block diagram of a CT system related to an embodiment.

FIG. 2 illustrates a schematic block diagram of a structure of the CT system 100.

The CT system 100 may include the gantry 102, the table 105, a controller 118, a storage unit 124, an image processor 126, an input unit 128, a display 130, and a communication unit 132.

As described above, the object 10 may be positioned on the table 105. In the present embodiment, the table 105 may move in a predetermined direction (e.g., at least one of up, down, right, and left directions), and movement of the table 105 may be controlled by the controller 118.

The gantry 102 may include a rotating frame 104, the X-ray generating unit 106, the X-ray detecting unit 108, a rotation driving unit 110, a data acquisition system (DAS) 116, and a data transmitter 120.

The gantry 102 may include the rotating frame 104 having a loop shape capable of rotating with respect to a predetermined rotation axis RA. Also, the rotating frame 104 may have a disc shape.

The rotating frame 104 may include the X-ray generating unit 106 and the X-ray detecting unit 108 that are arranged to face each other so as to have predetermined fields of view (FOV). The rotating frame 104 may also include an anti-scatter grid 114. The anti-scatter grid 114 may be positioned between the X-ray generating unit 106 and the X-ray detecting unit 108.

In a medical imaging system, X-ray radiation that reaches a detector (or a photosensitive film) includes not only attenuated primary radiation that forms a valuable image but also scattered radiation that deteriorates the quality of an image. In order to transmit most of the primary radiation and to attenuate the scattered radiation, the anti-scatter grid 114 may be positioned between a patient and the detector (or the photosensitive film).

For example, the anti-scatter grid 114 may be formed by alternately stacking lead foil strips and an interspace material such as a solid polymer material, solid polymer, or a fiber composite material. However, formation of the anti-scatter grid 114 is not limited thereto.

The rotating frame 104 may receive a driving signal from the rotation driving unit 110 and may rotate the X-ray generating unit 106 and the X-ray detecting unit 108 at a predetermined rotation speed. The rotating frame 104 may receive the driving signal and power from the rotation driving unit 110 while the rotating frame 104 contacts the rotation driving unit 110 via a slip ring (not shown). Also, the rotating frame 104 may receive the driving signal and power from the rotation driving unit 110 via wireless communication.

The X-ray generating unit 106 may receive a voltage and current from a power distribution unit (PDU) (not shown) via a slip ring (not shown) and then a high voltage generating unit (not shown), and may generate and emit an X-ray. When the high voltage generating unit applies a predetermined voltage (hereinafter, referred to as a tube voltage) to the X-ray generating unit 106, the X-ray generating unit 106 may generate X-rays having a plurality of energy spectra that correspond to the tube voltage.

The X-ray generated by the X-ray generating unit 106 may be emitted in a predetermined form due to a collimator 112.

The X-ray detecting unit 108 may be positioned to face the X-ray generating unit 106. The X-ray detecting unit 108 may include a plurality of X-ray detecting devices. Each of the plurality of X-ray detecting devices may establish one channel but one or more embodiments of the present disclosure are not limited thereto.

The X-ray detecting unit 108 may detect the X-ray that is generated by the X-ray generating unit 106 and that is transmitted through the object 10, and may generate an electrical signal corresponding to an intensity of the detected X-ray.

The X-ray detecting unit 108 may include an indirect-type X-ray detector for detecting radiation after converting the radiation into light, and a direct-type X-ray detector for detecting radiation after directly converting the radiation into electric charges. The indirect-type X-ray detector may use a scintillator. Also, the direct-type X-ray detector may use a photon counting detector. The DAS 116 may be connected to the X-ray detecting unit 108. Electrical signals generated by the X-ray detecting unit 108 may be collected by wire or wirelessly by the DAS 116. Also, the electrical signals generated by the X-ray detecting unit 108 may be provided to an analog-to-digital converter (not shown) via an amplifier (not shown).

According to a slice thickness or the number of slices, only some of a plurality of pieces of data collected by the X-ray detecting unit 108 may be provided to the image processor 126 via the data transmitter 120, or the image processor 126 may select only some of the plurality of pieces of data.

Such a digital signal may be provided to the image processor 126 via the data transmitter 120. The digital signal may be provided to the image processor 126 by wire or wirelessly.

The controller 118 may control an operation of each of the elements in the CT system 100. For example, the controller 118 may control operations of the table 105, the rotation driving unit 110, the collimator 112, the DAS 116, the storage unit 124, the image processor 126, the input unit 128, the display 130, the communication unit 132, or the like.

The image processor 126 may receive data acquired by the DAS 116 (e.g., raw data that is data before processing), via the data transmitter 120, and may perform pre-processing.

The pre-processing may include, for example, a process of correcting a sensitivity irregularity between channels and a process of correcting signal loss due to a rapid decrease in signal strength or due to the presence of an X-ray absorbing material such as metal.

Data output from the image processor 126 may be referred to as raw data or projection data. The projection data may be stored in the storage unit 124 with information about imaging conditions (e.g., the tube voltage, an imaging angle, etc.) during the acquisition of data.

The projection data may be a group of data values that correspond to the intensity of the X-ray that has passed through the object 10. For convenience of description, a group of a plurality of pieces of projection data that are simultaneously obtained from all channels at the same imaging angle is referred to as a projection data set.

The storage unit 124 may include at least one storage medium from among a flash memory-type storage medium, a hard disk-type storage medium, a multimedia card micro-type storage medium, card-type memories (e.g., an SD card, an XD memory, and the like), random access memory (RAM), static random access memory (SRAM), read-only memory (ROM), electrically erasable programmable ROM (EEPROM), programmable ROM (PROM), magnetic memory, a magnetic disc, and an optical disc.

The image processor 126 may reconstruct a cross-sectional image of the object 10 by using the acquired projection data set. The cross-sectional image may be a 3D image. In other words, the image processor 126 may reconstruct a 3D image of the object 10 by using a cone beam reconstruction method or the like, based on the acquired projection data set.

The input unit 128 may receive an external input with respect to an X-ray tomography imaging condition, an image processing condition, or the like. For example, the X-ray tomography imaging condition may include tube voltages, an energy value setting with respect to a plurality of X-rays, a selection of an imaging protocol, a selection of an image reconstruction method, a setting of a FOV area, the number of slices, a slice thickness, a parameter setting with respect to image post-processing, or the like. Also, the image processing condition may include a resolution of an image, an attenuation coefficient setting for the image, a setting for an image combining ratio, or the like.

The input unit 128 may include a device for receiving a predetermined input from an external source. For example, the input unit 128 may include a microphone, a keyboard, a mouse, a joystick, a touch pad, a touch pen, a voice recognition device, a gesture recognition device, or the like.

The display 130 may display an X-ray image reconstructed by the image processor 126.

Exchanges of data, power, or the like between the aforementioned elements may be performed by using at least one of wired communication, wireless communication, and optical communication.

The communication unit 132 may perform communication with an external device, an external medical apparatus, etc. via a server 134 or the like. The communication will now be described with reference to FIG. 3.

Figure 3:
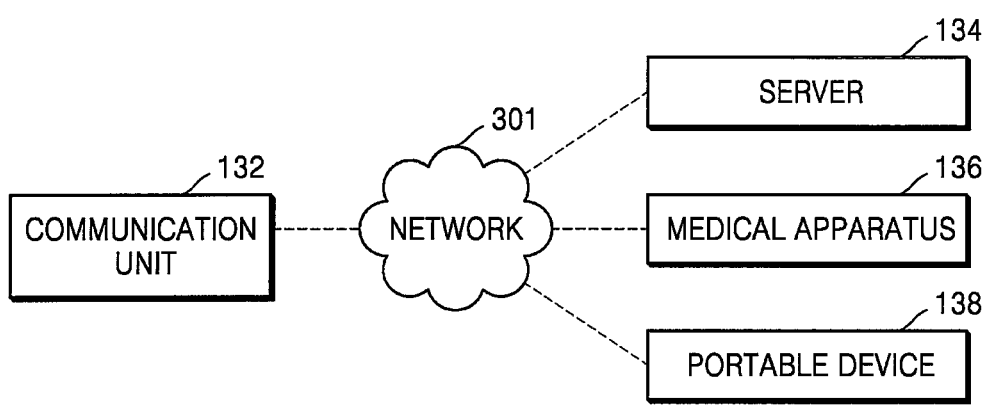
FIG. 3 illustrates a schematic block diagram of a communicator of FIG. 1, according to an embodiment.

FIG. 3 illustrates a schematic block diagram of the communication performed by the communication unit 132.

The communication unit 132 may be connected by wire or wirelessly to a network 301 and therefore may perform communication with the server 134, a medical apparatus 136, or a portable device 138. The communication unit 132 may exchange data with a hospital server or other medical apparatuses in a hospital connected via a picture archiving and communication system (PACS). Also, the communication unit 132 may perform data communication with the portable device 138 or the like, according to the digital imaging and communications in medicine (DICOM) standard.

The communication unit 132 may transmit and receive data related to diagnosing the object 10, via the network 301. Also, the communication unit 132 may transmit and receive a medical image obtained from the medical apparatus 136 such as a magnetic resonance imaging (MRI) apparatus, an X-ray apparatus, or the like.

Furthermore, the communication unit 132 may receive a diagnosis history or a medical treatment schedule about a patient from the server 134 and may use the diagnosis history or the medical treatment schedule to diagnose the patient. Also, the communication unit 132 may perform data communication not only with the server 134 or the medical apparatus 136 in a hospital but also with the portable device 138 of a user or patient.

Also, the communication unit 132 may transmit information about a device error, information about a quality control status, or the like to a system manager or a service manager via the network 301, and may receive feedback regarding the information from the system manager or service manager.

The communication unit 132 may include one or more elements, for example, a local area communication module, a wired communication module, and a mobile communication module, for allowing the apparatus to communicate with an external device.

The local area communication module is a module for performing near-distance communication within a predetermined distance. Examples of local area communication techniques according to an embodiment may include, but are not limited to, wireless LAN, Wi-Fi®, Bluetooth®, ZigBee®, Wi-Fi Direct® (WFD), ultra wideband (UWB), infrared data association (IrDA), Bluetooth® low energy (BLE), and near field communication (NFC).

The wired communication module refers to a module for communication using electric signals or optical signals. Examples of wired communication techniques according to an embodiment may include communication via a twisted pair cable, a coaxial cable, an optical fiber cable, and an Ethernet cable.

The mobile communication module transmits or receives wireless signals to or from at least one selected from a base station, an external terminal, and a server on a mobile communication network. The wireless signals may be voice call signals, video call signals, or various types of data for transmission and reception of text/multimedia messages.

Figure 4:
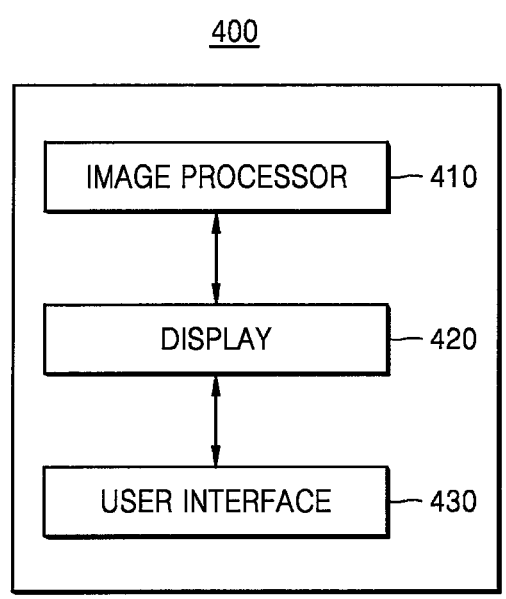
FIG. 4 illustrates a block diagram of a medical image processing apparatus according to an embodiment.

FIG. 4 illustrates a block diagram of a medical image processing apparatus 400 according to an embodiment.

The medical image processing apparatus 400 according to the embodiment may include a tomography apparatus described above with reference to FIGS. 1 to 3, a terminal, a portable device, and a server for processing a tomography image after receiving the tomography image.

In an image of blood vessels, the blood vessels and a contour of the blood vessels may be used to diagnose blood vessel diseases. In a blood vessel area, molecules such as low-density lipoprotein (LDL) cholesterol, fragments of cells, or calcium are captured in a vessel wall, thereby forming a plurality of plaque. Since it is difficult to extract a contour of the blood vessel area precisely in a region where a plaque exists, the medical image processing apparatus 400 extracts at least one contour of the blood vessel area from the image of the blood vessel area. The medical image processing apparatus 400 may display an image in which the contour of the blood vessel area is represented. In addition, the medical image processing apparatus 400 may correct the image by receiving a user input for correcting the at least one contour of the blood vessel area. The medical image processing apparatus 400 may display an image to which the corrected contour line is reflected.

According to an embodiment, the medical image processing apparatus 400 includes an image processor 410, a display 420, and a user interface 430. However, not all the provided elements are essential elements. The medical image processing apparatus 400 may be implemented by more elements or less elements than those of FIG. 4. The above elements will be described below.

The image processor 410 extracts a blood vessel area and at least one contour line of the blood vessel area from a first image including the blood vessel area. The image processor 410 may obtain a second image representing at least one plaque area based on the extracted blood vessel area and the contour line of the blood vessel area.

For example, the first image may be a three-dimensional (3D) computed tomography (CT) image. Also, the first image may include a CT image that is obtained through a multi-energy CT imaging operation after injecting a contrast medium. The first image may be an image that is obtained by the medical image processing apparatus 400 that has directly captured a blood vessel area of an object, or an image obtained from an external device that is physically separated.

Here, the external device may be a device for obtaining, storing, processing or utilizing data related to CT images, and may include a medical image apparatus, a medical server, a portable terminal, or all kinds of computing devices capable of utilizing or processing medical images. For example, the external device may be a medical diagnosis apparatus provided in a medical institution such as a hospital. Also, the external device may be a server for recording and storing medical history of a patient in a hospital, a medical image apparatus that a doctor uses to determine a medical image, etc.

In addition, the extracted blood vessel area and the contour line of the blood vessel area may be visualized by performing curved planar reformation (CPR) or straightened curved planar reformation (SCPR).

In addition, the blood vessel is a coronary artery, and the at least one contour line of the blood vessel area is a lumen contour line and a vessel wall contour line of the coronary artery. Here, "lumen" denotes a cylindrical tissue along with an internal surface of the blood vessel, and "vessel wall" denotes an external surface forming the blood vessel. The image processor 410 may precisely extract a lumen contour line and a vessel wall contour line, and may control the display 420 to display the extracted lumen contour line and the vessel wall contour line.

The image processor 410 detects at least one plaque based on the blood vessel area and the at least one contour line, and performs labelling on the detected at least one plaque to obtain the second image representing an area of the at least one plaque. Here, the labelling denotes a process of assigning a same number to adjacent pixels and assigning different numbers to components that are not connected in an image. The labelling is a process of grouping pixels configuring each object, and may be used to recognize an object or to extract an object.

In detail, the image processor 410 may perform the labelling by using at least one of a maximum intensity projection and a minimum intensity projection. However, it would be obvious to one of ordinary skill in the art that the image processor 410 may perform the labelling by using other methods than the aforementioned methods.

The image processor 410 may control the display 420 to display a predetermined image. The display 420 displays a predetermined image so that a user or a patient may visibly recognize the predetermined image or information. The display 420 may correspond to the display 420 illustrated in FIG. 1, or may be a separate member from the CT system illustrated in FIG. 1.

The display 420 displays a predetermined image. In detail, the display 420 may display the predetermined image according to control of the image processor 410. The display 420 includes a display panel (not shown), and may display a user interface 430 screen, a medical image screen, etc. on the display panel.

The display 420 may display the second image representing at least one plaque area. The display 420 may output various information processed by the medical image processing apparatus 400 via a graphical user interface (GUI) on the display panel. Also, the medical image processing apparatus 400 may include two or more displays 420 according to an implementation format thereof.

The display 420 may display at least one of the first image representing the blood vessel area and the second image representing the at least one plaque area. Also, the display 420 may display at least one of an enlarged image corresponding to a view of the plaque and a cross-sectional image corresponding to the view of the plaque.

The display 420 may separately or simultaneously display an image before correcting the contour line of the blood vessel area and an image after correcting the contour line of the blood vessel area. Also, the display 420 may display the contour line of the blood vessel area to be distinguished between before and after correction. In detail, a part that has been corrected may overlap the image before correcting the contour line of the blood vessel area. A corrected part may be indicated by solid lines or dotted lines to be distinguishable.

The display 420 may include at least one of a liquid crystal display (LCD), a thin film transistor-liquid crystal display (TFT-LCD), an organic light-emitting diode (OLED), a flexible display, a 3D display, and an electrophoretic display.

The user interface 430 is a device for receiving data from a user for controlling the medical image processing apparatus 400. The user interface 430 may include a hardware configuration such as a keypad, a mouse, a touch panel, a touch screen, a trackball, and a jog switch, but is not limited thereto. In addition, the user interface 430 may further include various input units such as a voice recognition sensor, a gesture recognition sensor, a fingerprint recognition sensor, an iris recognition sensor, a depth sensor, and a distance sensor.

The user interface 430 receives a user input for correcting at least one contour line corresponding to at least one plaque area represented in the second image. Here, the second image represents an area of the at least one plaque.

The user interface 430 may receive a predetermined command or data from the user via a screen of the user interface 430. In detail, the user interface screen may receive a manipulation signal for correcting the contour line corresponding to the plaque area via various input tools. The manipulation signal may be input through a touch input of the user. The user interface screen may receive a signal for correcting the contour line displayed on the screen by using the user's finger or a physical tool through a drag & drop gesture. The image processor 410 may correct the contour line of the plaque area according to the manipulation signal for correcting the contour line. In addition, by correcting the contour line of the plaque area, the lumen contour line and/or the vessel wall contour line of the blood vessel area may be simultaneously corrected.

The user interface 430 may generate and output the user interface screen for receiving the predetermined command or data from the user. For example, the user interface 430 may generate and output a screen for selecting first plaque that is one of the at least one plaque. For example, the user interface 430 may generate and output a screen for receiving a touch signal on each of the at least one plaque in the blood vessel area.

The user interface 430 receives the input for selecting the first plaque from among the one or more plaque. The display 420 displays the second image representing a view of the first plaque according to a preset criterion. Here, the preset criterion may be characterized in that an area of the first plaque is set as a maximum depth of the first plaque or a maximum area of the first plaque area. When the medical image processing apparatus 400 sets the view of the first plaque as the maximum depth or the maximum area of the first plaque area, a view allowing the user to easily correct the first plaque area may be provided. However, it is obvious that the view of the first plaque may be represented based on criteria other than the above.

The display 420 displays the second image representing the at least one plaque area. The second image may correspond to at least one of enlarged images corresponding to the views of the first plaque and a cross-sectional image corresponding to the views of the first plaque.

In detail, the cross-sectional image corresponding to the views of the first plaque may include at least one of a cross-sectional image of a normal blood vessel around the first plaque area, a cross-sectional image in which the first plaque area is set to be the maximum depth or the maximum area, and a cross-sectional image that is adjacent to the cross-sectional image in which the first plaque area is set to be the maximum depth or the maximum area.

The user interface 430 receives an input for selecting the first plaque from among the one or more plaque, and the display 420 may display the second image representing the first plaque area. Here, the second image may be obtained based on a three-dimensional (3D) image, or may include a plurality of images corresponding to the first plaque. The display 420 may display a second view of the first plaque, wherein the second view is shifted from a first view of the first plaque.

The user interface 430 may receive a first input of the user for correcting at least one contour line on the first image of the first plaque. The image processor 410 may correct the first image of the first plaque based on the first input. The display 420 may display a corrected first image of the first plaque.

In addition, the image processor 410 may correct a plurality of images that are different from the first image of the first plaque, based on the first input. Here, the plurality of images corresponds to the first plaque, except for the first image. The image processor 410 may simultaneously correct the plurality of images only based on the first input of the user, without receiving an additional input of the user. The display 420 may display the plurality of images that are corrected.

The medical image processing apparatus 400 may further include a storage unit (not shown) and a communicator (not shown). The storage unit (not shown) may correspond to the storage unit 124 of FIG. 2, and the communicator (not shown) may correspond to the communicator 132 of FIG. 2.

The storage unit (not shown) may store data related to the CT image (e.g., CT images, CT image data, and diagnosis data of a patient) and data transmitted from an external device to the medical image processing apparatus 400. The data transmitted from the external device may include information about a patient, data necessary for diagnosing and treating the patient, a previous medical history of the patient, and a medical work list corresponding to diagnosis and directions for the patient.

The storage unit (not shown) stores the first image representing the blood vessel area and the second image representing at least one plaque area. Also, the storage unit (not shown) may store an image before correcting the contour line of the blood vessel area and an image after correcting the contour line of the blood vessel area, and may store the data for correcting the contour line of the blood vessel area.

The communicator (not shown) may transmit the first image and/or the second image to the external device (e.g., a medical storage apparatus and a medical apparatus), or may receive data necessary for diagnosing a patient from the external device. Also, the communicator (not shown) may transmit images and/or data stored in the storage unit (not shown) to the external device via a network.

For example, the communicator (not shown) may be connected to the medical image processing apparatus 400 via a communication network such as Wi-Fi or Wi-Fi direct. In more detail, the wireless communication network to which the communicator (not shown) is accessible may include, but is not limited to, wireless LAN, Wi-Fi®, Bluetooth®, ZigBee®, Wi-Fi Direct® (WFD), ultra wideband (UWB), infrared data association (IrDA), Bluetooth® low energy (BLE), and near field communication (NFC).

The medical image processing apparatus 400 may precisely visualize contour lines of coronary arteries by using a CT image. The medical image processing apparatus 400 may reduce a time duration taken to extract contour lines of the coronary arteries, by correcting a contour line of the plaque, the lumen contour line, and/or the vessel wall contour line based on an each plaque area.

The medical image processing apparatus 400 includes a central processor that controls overall operations of the image processor 410, the display 420, and the user interface 430. The central processor may be implemented as an array of a plurality of logic gates, or a combination of a universal micro-processor and a memory storing a program that may be executed on the micro-processor. Otherwise, one of ordinary skill in the art would appreciate that the central processor may be implemented as another type of hardware.

Hereinafter, operations or applications executed by the medical image processing apparatus 400 will be described below. Although none of the image processor 410, the display 420, and the user interface 430 are specified, features and aspects that would be clearly understood by and are obvious to those of ordinary skill in the art may be considered as a typical implementation. The scope of the present inventive concept is not limited by a name of a particular component or physical/logical structure.

Figure 5:
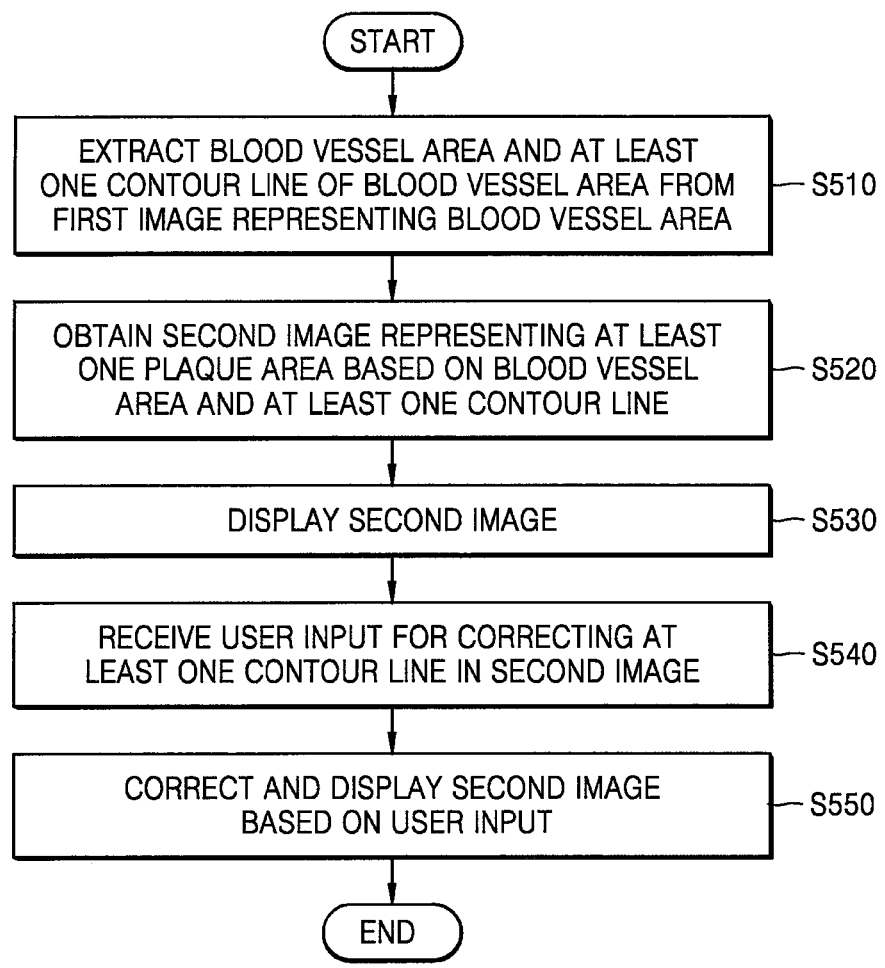
FIG. 5 illustrates a flowchart of a medical image processing method according to an embodiment.

FIG. 5 illustrates a flowchart of a medical image processing method according to an embodiment.

In operation S510 of FIG. 5, the medical image processing apparatus 400 extracts a blood vessel area and at least one contour line of the blood vessel area from a first image showing blood vessels. The medical image processing apparatus 400 may obtain the first image by directly imaging a blood vessel area of an object, or may obtain the first image from an external device that is physically independent from the medical image processing apparatus 400.

Here, the first image may be a CT image obtained through a multi-energy CT imaging operation after injecting a contrast medium to the object. In addition, a blood vessel may be a coronary artery, and the at least one contour line of the blood vessel area may include a lumen contour line and a vessel wall contour line of the coronary artery.

In operation S520, the medical image processing apparatus 400 obtains a second image representing at least one plaque area based on the blood vessel area and the at least one contour line. Since diagnosing of hemadostenosis is dependent upon a part occupied by the plaque area in the blood vessel, it is necessary to accurately extract the contour line of the plaque area.

The medical image processing apparatus 400 detects one or more plaque based on the blood vessel area and the at least one contour line of the blood vessel area. The medical image processing apparatus 400 performs labelling on the detected one or more plaque to obtain the second image representing the at least one plaque area.

The medical image processing apparatus 400 may perform the labelling by using at least one of a maximum intensity projection and a minimum intensity projection. An image obtained as a result of the labelling operation will be described later with reference to FIG. 8.

In operation S530, the medical image processing apparatus 400 displays the second image representing the at least one plaque area.

The medical image processing apparatus 400 receives an input for selecting first plaque from among the one or more plaque, and displays a plurality of images of the first plaque. The medical image processing apparatus 400 may display images about the first plaque from among the plurality of plaque. Processes of displaying images corresponding to a view of the first plaque will be described later with reference to FIG. 6.

In operation S540, the medical image processing apparatus 400 receives a user input for correcting the at least one contour line in the second image.

The medical image processing apparatus 400 receives the user input for correcting the at least one contour line corresponding to at least one from among the at least one plaque area. For example, the medical image processing apparatus 400 detects the first plaque, second plaque, and third plaque from the image. The user may select the first plaque from among the first to third plaque to correct the first plaque area. The medical image processing apparatus 400 may receive an input for selecting the first plaque and an input for correcting a boundary of the first plaque. In detail, the medical image processing apparatus 400 may receive an input for correcting the lumen contour line and the vessel wall contour line of the coronary artery based on the first plaque area.

In operation S550, the medical image processing apparatus 400 corrects and displays the second image based on the user input.

The medical image processing apparatus 400 corrects the boundary of the first plaque area in the second image based on the user input, and displays the second image that has been corrected. The medical image processing apparatus 400 may display the second image before being corrected and the second image after being corrected. The medical image processing apparatus 400 may mark a corrected portion to be distinguished on the second image before being corrected. For example, the medical image processing apparatus 400 may display the corrected part denoted by dotted lines to overlap with the image before being corrected.

Figure 6:
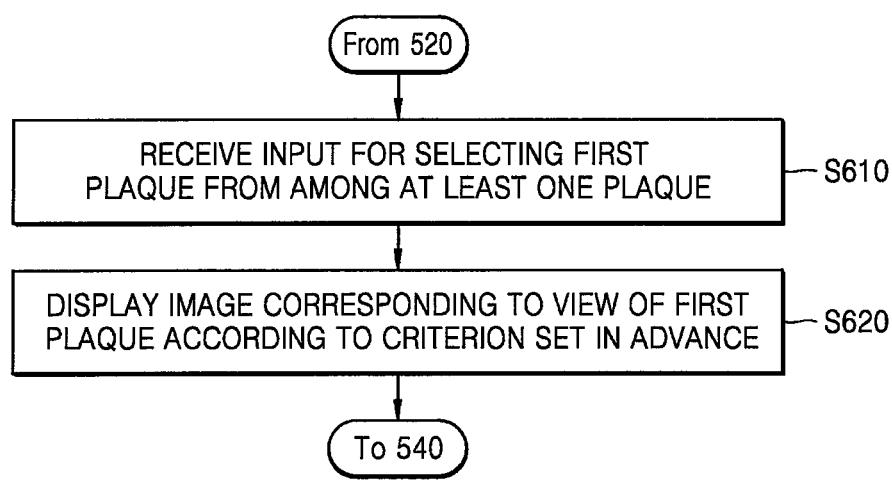
FIG. 6 illustrates a flowchart of a method of displaying a second image that represents a plaque area, according to an embodiment.

FIG. 6 illustrates a flowchart of processes of displaying a second image representing a plaque area, according to an embodiment.

In operation S610 of FIG. 6, the medical image processing apparatus 400 receives an input for selecting the first plaque from among one or more plaque.

The medical image processing apparatus 400 may display an image, in which one or more plaque are detected in a coronary artery. The user may correct a boundary of the one or more plaque, if it is determined that a contour line of the coronary artery has to be corrected clearly in the one or more plaque. The medical image processing apparatus 400 may receive an input for selecting first plaque from among the one or more plaque.

In operation S620, the medical image processing apparatus 400 displays an image corresponding to a view of the first plaque according to a criterion set in advance.

Here, the criterion set in advance may be a criterion by which the first plaque area is set to be the maximum depth of the first plaque. In addition, the criterion set in advance may be a criterion by which the first plaque area is set to be the maximum area. The criterion set in advance is merely an example. That is, one of ordinary skill in the art would appreciate that the medical image processing apparatus 400 may display an image corresponding to the view of the first plaque according to the criterion that allows the user to easily correct the first plaque area.

The display 420 may display at least one of enlarged images corresponding to the view of the first plaque and a cross-sectional image corresponding to the view of the first plaque. The cross-sectional image corresponding to the view of the first plaque may include at least one of a cross-sectional image of a normal blood vessel around the first plaque area, a cross-sectional image of the first plaque area set to the maximum depth or the maximum area, and a cross-sectional image of a part adjacent to the cross-sectional image of the first plaque area set to the maximum depth or the maximum area.

In addition, the display 420 may display an image representing a second view of the first plaque, wherein the second view is obtained by rotating the first plaque by a preset angle based on the first view of the first plaque.

Figure 7:
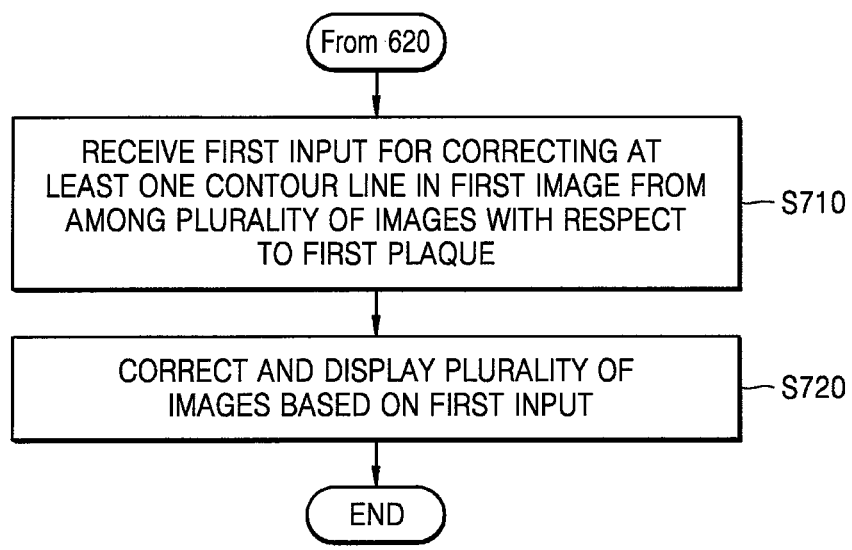
FIG. 7 illustrates a flowchart of a method of correcting and displaying a plurality of images based on reception of a user input, according to an embodiment.

FIG. 7 illustrates a flowchart of a method of correcting and displaying a plurality of images based on reception of user input, according to an embodiment.

In operation S710 of FIG. 7, the medical image processing apparatus 400 receives a first input for correcting at least one contour line in the first image from among a plurality of images about the first plaque.

The medical image processing apparatus 400 may receive the first input from the user for correcting the lumen contour line and the vessel wall contour line of the coronary artery in the first image of the first plaque.

In operation S720, the medical image processing apparatus 400 corrects and displays the plurality of images based on the first input.

The medical image processing apparatus 400 corrects the first image of the first plaque based on the first input. The medical image processing apparatus 400 may correct the plurality of images, except the first image, based on a result of correcting the first image. In detail, the medical image processing apparatus 400 may correct the plurality of images, except the first image, by using at least one of a Hounsfield unit (HU) value and an HU gradient at a corrected location in the first image, that is, a CT image.

Figure 8:
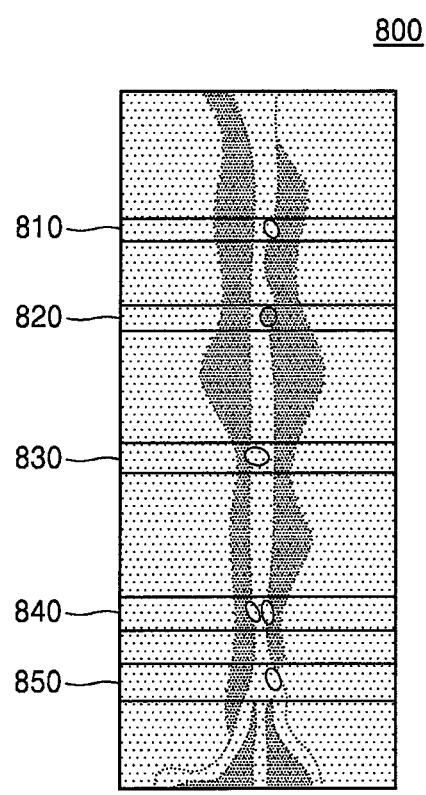
FIG. 8 illustrates a diagram of an image in which labelling is performed on a second image that represents a plaque area, according to an embodiment.

FIG. 8 illustrates a diagram of an image in which labelling is performed on a second image representing a plaque area, according to an embodiment.

The medical image processing apparatus 400 may obtain a CT image in which a coronary artery is emphasized by a contrast medium. The medical image processing apparatus 400 extracts the coronary artery from the CT image, and extracts a lumen contour line and a vessel wall contour line of the coronary artery. In this case, the extracted coronary artery and the contour line of the coronary artery may be visualized by performing curved planar reformation (CPR) or straightened curved planar reformation (SCPR).

An image 800 of FIG. 8 may be the second image that is obtained by extracting the coronary artery from the first image. The display 420 may display the image 800 for correcting the contour line. Referring to FIG. 8, at least one plaque area may be visualized to be distinguished from an area where the plaque does not exist in the second image 800.

Hereinafter, an example of performing the aforementioned discrimination by using the labelling will be described.

The medical image processing apparatus 400 detects a plurality of plaque in the coronary artery based on the extracted coronary artery, and performs area setting and labelling with respect to each of the plurality of plaque 810, 820, 830, 840, and 850. The medical image processing apparatus 400 may perform the area setting and labelling with respect to each of the plurality of plaque 810, 820, 830, 840, and 850 by using at least a maximum intensity projection and a minimum intensity projection.

As shown in FIG. 8, the medical image processing apparatus 400 performs the labelling, thereby setting an area included in the plaque and assigning a number to each of detected plaque 810, 820, 830, 840, and 850. In general, plaque may be classified as soft plaque and calcium plaque, or as more variety kinds of plaque. In detail, since calcium plaque is shown brighter than the blood vessel to which the contrast medium is injected, the plaque area may be bright in the blood vessel area of the CT image. In addition, the blood vessel area may be brighter than the other region that is not the blood vessel in the CT image. However, since the soft plaque is darker than the blood vessel to which the contrast medium is injected, the plaque area may be dark in the blood vessel area of the CT image.

Figure 9:
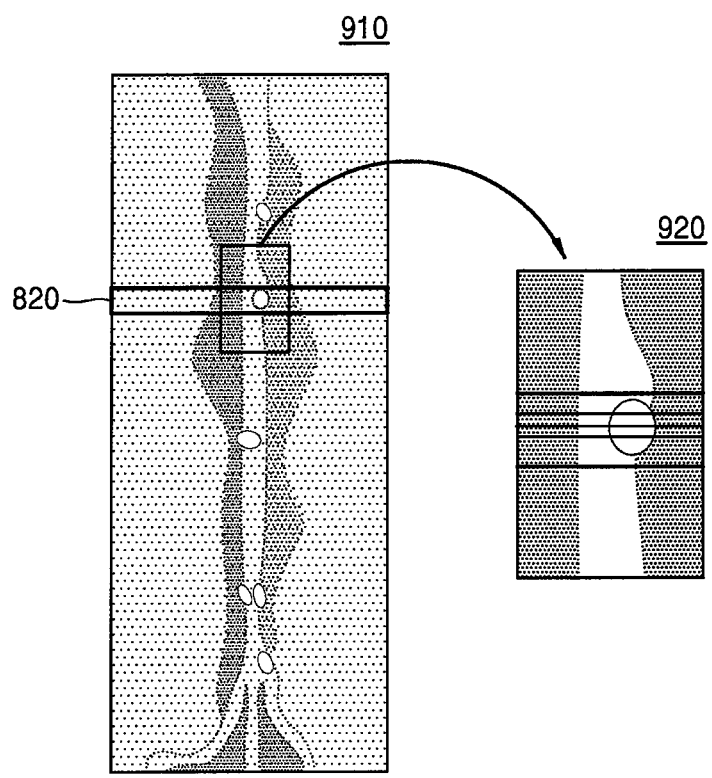
FIG. 9 illustrates a diagram of an enlarged view of first plaque that is selected from a plurality of plaque, according to an embodiment.

FIG. 9 illustrates a diagram of an enlarged image of first plaque that is selected from among a plurality of plaque, according to an embodiment.

The medical image processing apparatus 400 may receive an input for selecting first plaque 820 from among the plurality of plaque. The display 420 may display a plurality of images corresponding to the first plaque 820.

As shown in an image 910 and an image 920 of FIG. 9, the medical image processing apparatus 400 may receive the input for selecting the first plaque 820, and may display an enlarged image of an image corresponding to the view of the first plaque 820.

The medical image processing apparatus 400 may display enlarged images respectively corresponding to the plurality of plaque, even without receiving the input for selecting the first plaque 820. Each of the plurality of plaque may have different location and size in the blood vessel from one another. Therefore, each plaque occupies different part from the other, and enlarged images corresponding respectively to the plurality of plaque may be displayed. The user may precisely correct a boundary of the plaque area, and may accurately determine a degree of angiostenosis.

As shown in the image 910, the medical image processing apparatus 400 may represent the image in which the plurality of plaque is labelled as the CPR. In addition, the image in which the plurality of plaque are labelled may be obtained based on the CT image that is obtained by a multi-energy CT imaging operation after injecting a contrast medium into an object. The image in which the plurality of plaque is labelled may be a 3D image. The user may observe the blood vessel while pivoting the image, in which the plurality of plaque is labelled, about a center line of the blood vessel through the medical image processing apparatus 400.

As shown in an image 920, the medical image processing apparatus 400 may receive an input for selecting the first plaque 820 from among the plurality of plaque. The medical image processing apparatus 400 may display an enlarged image of an area of the first plaque 820. In this case, the image 920 is enlarged based on an image observed from a first view of the image, in which the plurality of plaque is labelled. The medical image processing apparatus 400 may provide a function of pivoting the image 920, so that the user may observe the plaque area from a second view that is different from the first view. The user may observe the area of the first plaque 820 from the second view that is pivoted by 30□ in a clockwise direction from the first view. The aforementioned angle is an example, and the area of the first plaque 820 may be observed from the second view that has pivoted by a different angle (e.g., 45□, 60□).

The medical image processing apparatus 400 may display at least one of the plurality of images of the first plaque 820, which correspond to a plurality of views. For example, the medical image processing apparatus 400 may simultaneously display a cross-sectional image corresponding to the first view, a cross-sectional image corresponding to the second view, and a cross-sectional image corresponding to a third view. The medical image processing apparatus 400 may receive an input for selecting at least one of the cross-sectional images corresponding to the first to third views and correcting a contour line of the blood vessel. Here, the first view to the third view may be pivoting angles set in advance by the user about the center line of the blood vessel.

Figure 10:
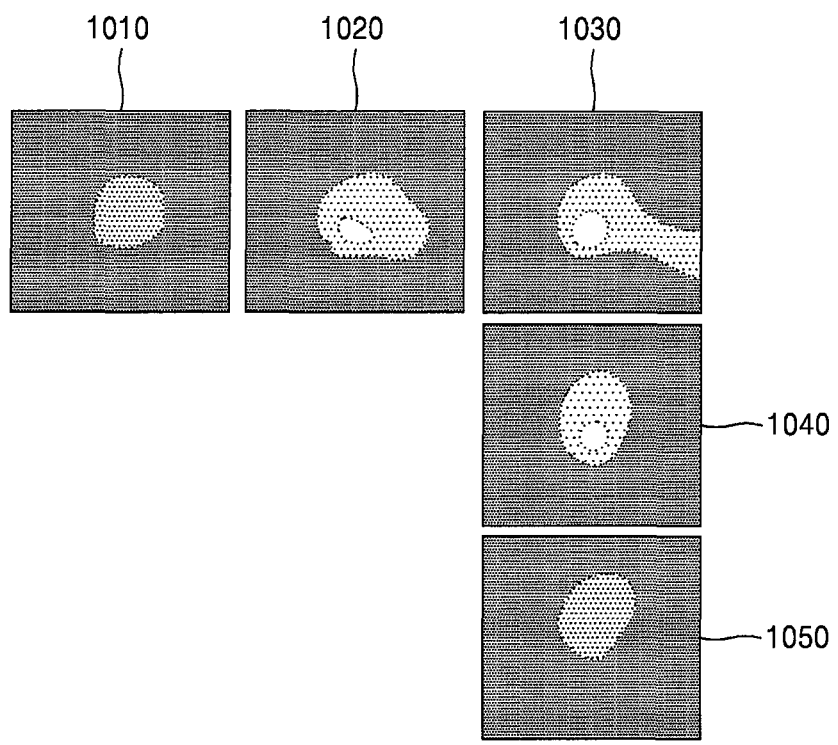
FIG. 10 illustrates a diagram of a plurality of cross-sectional images corresponding to views of first plaque, according to an embodiment.

FIG. 10 illustrates a diagram of a plurality of cross-sectional images corresponding to views of first plaque.

The medical image processing apparatus 400 may display the cross-sectional images corresponding to the views of the first plaque. Referring to an image 1000, an image 1010 is a cross-sectional image of a normal blood vessel around the first plaque area. As shown in the image 1010, there is no plaque in the cross-sectional image of the normal blood vessel, and a cross-section of the center line of the blood vessel may be only observed. An image 1020 is a cross-sectional image adjacent to a cross-sectional image of the first plaque area that is set to have the maximum depth. In detail, the image 1020 is a cross-sectional image corresponding to a cross-section in which the first plaque area is set as the maximum depth to a 50% depth. An image 1030 is a cross-sectional image when the first plaque area is set to be the maximum depth or the maximum area. An image 1040 is a cross-sectional image adjacent to a cross-section in which the first plaque area is set to be the maximum area. In detail, the image 1040 corresponds to the cross-section when the first plaque area is set to be the maximum area to a 50% area. An image 1050 is another image of a normal blood vessel around the first plaque area. An image 1060 is a cross-sectional image of the entire first plaque area. As shown in the image 1060, a first plaque area 1061 is represented to be the brightest, and a blood vessel area 1062 may be darker than the first plaque area 1061. Otherwise, unlike the image 1060, the first plaque area 1061 may be the darkest, and the blood vessel area 1062 may be brighter than the first plaque area 1061.

Figure 11:
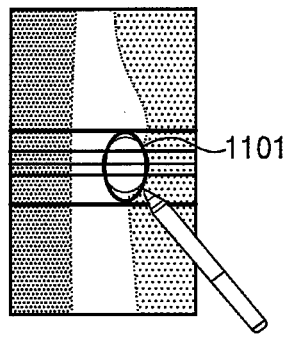
FIG. 11 illustrates a diagram of a screen that is displayed before correcting a plurality of cross-sectional images, according to an embodiment.
Figure 11:
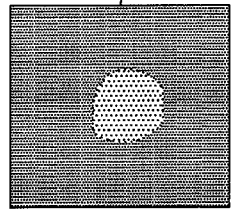
Figure 11:
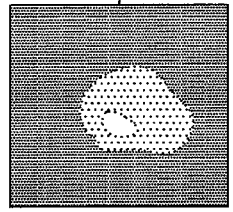
Figure 11:
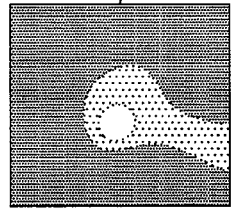
Figure 11:
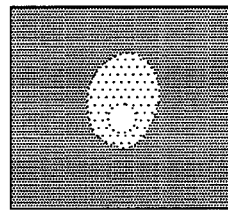
Figure 11:
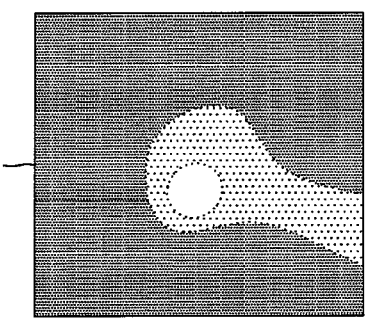
Figure 11:
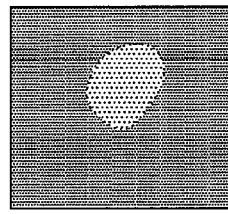

FIG. 11 illustrates a diagram of a screen displaying a plurality of cross-sectional images before being corrected, according to an embodiment.

The medical image processing apparatus 400 may receive a user input for correcting at least one contour line of a plaque area via the user interface 430.

In the medical image processing apparatus 400, when the display 420 and the user interface 430 are layered to configure a touch screen, the display 420 may be used as an input device that may input information according to a touch of the user, besides being used as the output device. In this case, the display 420 may include a touch screen, the touch screen may be configured to detect pressure of a touch input, as well as a location of the touch input, and a touched area. In addition, the touch screen may be configured to detect a proximity touch, as well as a direct touch.

As shown in an image 1110 of FIG. 11, the medical image processing apparatus 400 may display an enlarged image of a first plaque area 1101. The user may visibly recognize certain information from the user interface 430 screen displayed on the display 420, and may input a predetermined command or data via the user interface 430. The first plaque area 1101 is brighter than the other portions in the image, and a blood vessel area may be darker than the first plaque area 1101. On the contrary, the first plaque area 1101 may be darker than the other portions in the image, and the blood vessel area may be brighter than the first plaque area 1101. By correcting a contour line of the first plaque area 1101, a lumen contour line and/or a vessel wall contour line of the blood vessel area may be corrected.

The user interface 430 may be implemented as a touch pad. In more detail, when a command for correcting the contour line of the plaque area is input through the user interface 430 screen, the touch pad senses the command and transmits sensed information to the image processor 410. Then, the image processor 410 analyzes the sensed information to read and execute the user's command for correcting the contour line of the plaque area.

As shown in an image 1120 of FIG. 11, the medical image processing apparatus 400 may display a plurality of cross-sectional images 1010, 1020, 1030, 1040, 1050, and 1060 corresponding to views of the first plaque. The user may select at least one from among the plurality of cross-sectional images 1010, 1020, 1030, 1040, 1050, and 1060, so as to correct the contour line of the blood vessel area, the contour line of the plaque area, etc. The medical image processing apparatus 400 may receive a user input for correcting an enlarged image of the first plaque area 1101, and may receive a user input for correcting at least one from among the plurality of cross-sectional images 1010, 1020, 1030, 1040, 1050, and 1060.

Figure 12:
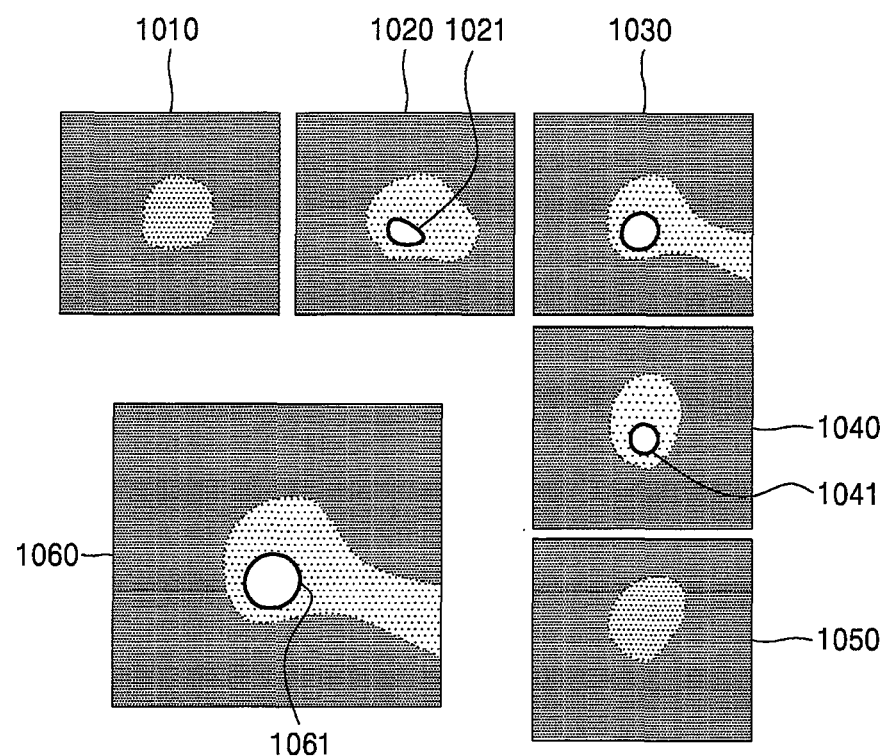
FIG. 12 illustrates a diagram of a screen that is displayed after correcting a plurality of cross-sectional images, according to an embodiment.

FIG. 12 illustrates a diagram of a screen displayed after correcting a plurality of cross-sectional images, according to an embodiment.

As shown in an image 1210 of FIG. 12, the medical image processing apparatus 400 may correct the contour line of the first plaque area in a first image, based on a user input. In this case, the medical image processing apparatus 400 may visualize a corrected part to be distinguished from a part before being corrected. In detail, the corrected part may be displayed while overlapping the part before being corrected.

As shown in an image 1220 of FIG. 12, the medical image processing apparatus 400 may correct the plurality of images 1020, 1030, 1040, and 1060, except the first image, based on the user input. The medical image processing apparatus 400 may correct the first image based on the user input, and may correct the plurality of images 1020, 1030, 1040, and 1060, except the first image, based on a result of correcting the first image. The medical image processing apparatus 400 may correct a plurality of images 1021, 1031, 1041, and 1061 corresponding to the first plaque via only one user input. In addition, the user may correct the contour line of the first plaque area based on one of the plurality of images (1021, 1031, 1041, and 1061).

Figure 13:
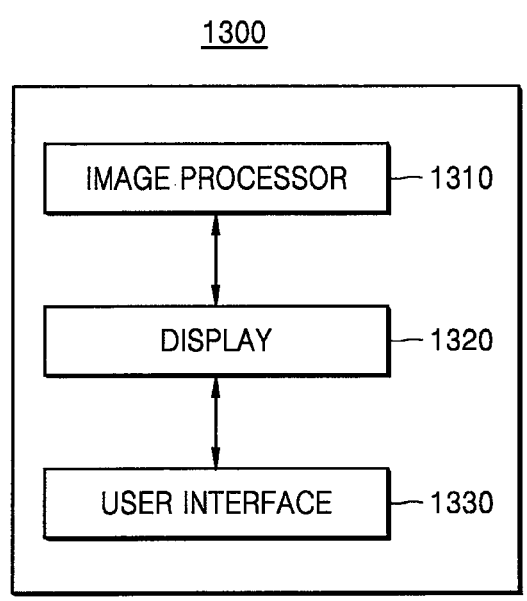
FIG. 13 illustrates a block diagram of a medical image processing apparatus according to an embodiment.

FIG. 13 illustrates a block diagram of a medical image processing apparatus 1300 according to another embodiment.

According to the embodiment, the medical image processing apparatus 1300 corrects a boundary of a blood vessel in a CT image. The medical image processing apparatus 1300 may display a plurality of images corresponding to a plurality of views of a CT image. The medical image processing apparatus 1300 may extract a center line of the blood vessel from the plurality of images, and may correct a contour line of the blood vessel in each of the plurality of images based on an input for correcting the contour line of the blood vessel.

The medical image processing apparatus 1300 may include an image processor 1310, a display 1320, and a user interface 1330. However, not all the elements shown in FIG. 13 are essential elements. That is, more or less elements than those of FIG. 13 may implement the medical image processing apparatus 1300. Hereinafter, the elements will be described.

The image processor 1310 may extract a center line of the blood vessel from a first image representing a blood vessel area. The image processor 1310 may generate a plurality of images corresponding to a plurality of views around the blood vessel area, based on the center line of the blood vessel. In more detail, the blood vessel may be coronary artery. The plurality of views may be set in advance by a user. The plurality of images corresponding to the plurality of views may be cross-sectional images that are obtained by pivoting a point of view from a reference location about the center line of the blood line.

The display 1320 displays a predetermined screen. In more detail, the display 1320 may display the predetermined screen according to control of the image processor 1310. The display 1320 may include a display panel (not shown), and may display a screen of the user interface 1330 and a medical image screen on the display panel.

The display 1320 displays the plurality of images including the center line of the blood vessel. The display 1320 may output various pieces of information processed by the medical image processing apparatus 1300 on the screen via a graphical user interface (GUI).

The user interface 1330 is a device for receiving an input of data for controlling the medical image processing apparatus 1300 from the user. Here, the user interface 1330 may include a hardware configuration such as a keypad, a mouse, a touch panel, a touch screen, a trackball, and a jog switch, but is not limited thereto.

The user interface 1330 receives a first input for correcting a blood vessel area in a first view image corresponding to a first view, from among the plurality of images. For example, the user interface 1330 may receive the first input for correcting at least one contour line of the blood vessel area. The contour line of the blood vessel area may correspond to at least one of a lumen contour line and a vessel wall contour line of the coronary artery.

The image processor 1310 corrects the first view image, in correspondence with the first input. The image processor 1310 may correct the lumen contour line or the vessel wall contour line in the first view image. The image processor 1310 may correct at least one image, except the first view image, from among the plurality of images based on a result of correcting the first view image.

The image processor 1310 analyzes a HU profile of the first view image that has been corrected. As a result of analyzing the HU profile, the image processor 1310 may obtain a HU value and a HU gradient of a corrected part. The image processor 1310 may correct the images corresponding to the other views that are different from the first view, by applying an image dividing algorithm that uses a region growing and/or an active contour. In this case, the image processor 1310 may correct locations in the images corresponding to the different views, wherein the locations correspond to the corrected location in the first view image. The above method of correcting the images is an example, and one of ordinary skill in the art would appreciate the images may be corrected by using another method. In addition, the image processor 1310 may separately process a portion where a branch exists. The image processor 1310 may perform an exception process on the branch by using a marking tool so that the contour may not leak through the branch. The process of the branch is an example, and one of ordinary skill in the art would appreciate that the branch may be processed by using another method.

The medical image processing apparatus 1300 may include the display 1320 and the user interface 1330 that are layered to configure a touch screen. When the display 1320 and the user interface 1330 are configured as the touch screen, the display 1320 may be used as an input device via which information may be input according to a touch operation of the user, as well as being used as an output device. In this case, the medical image processing apparatus 1300 may display a control panel with respect to the CT image on the touch screen. The medical image processing apparatus 1300 may sense a touch gesture of the user with respect to the CT image through the touch screen.

In addition, the medical image processing apparatus 1300 may include buttons that are frequently used by the user, from among buttons included in the control panel, as physical buttons, and may provide the other buttons via the touch screen as a GUI format.

In addition, the user interface 1330 may receive a second input for correcting a blood vessel area of a second view image from among the plurality of images. The image processor 1310 corrects the second view image based on the second input. Here, the image processor 1310 has corrected the first view image based on the first input, and thus, the image processor 1310 may correct other images, except the first view image and the second view image, based on a result of correcting the second view image. Also, even when the first view image has been corrected based on the first input, the image processor 1310 may correct the plurality of images, except the second view image, based on the result of correcting the second view image.

The display 1320 may display the plurality of images that are corrected. In detail, the display 1320 may display the first view image that has been corrected based on the first input and the plurality of images that have been corrected based on the second input.

Also, the display 1320 may constitute and display a screen in which the corrected part and the part before being corrected are distinguished from each other with respect to each of the plurality of images. The user interface 1330 may receive at least one of an input for approving the corrected part and an input for re-correcting the corrected part. The display 1320 may display the plurality of images, to which the input for approving the corrected part or the input for re-correcting the corrected part is applied.

The medical image processing apparatus 1300 may further include a communicator (not shown) and a storage unit (not shown). The communicator (not shown) may receive a first image representing a blood vessel area from an external device. The communicator (not shown) may transmit and receive data related to diagnosis of an object, such as a CT image and CT data of the object, through a network. Here, the external device may include a CT apparatus, a magnetic resonant imaging (MRI) apparatus, an X-ray apparatus, etc., but is not limited thereto. Moreover, the communicator may receive information about a medical history of a patient or a treatment schedule from a server to utilize the information in diagnosing the object. The communicator may perform data communication with a portable terminal of a doctor or a patient, as well as a server, a medical device, etc. in a hospital.

The storage unit (not shown) stores various pieces of information processed in the medical image processing apparatus 1300. For example, the storage unit (not shown) may store medical data related to diagnosis of a patient, such as input/output images about a blood vessel area, a plurality of images corresponding to a plurality of views based on a center line of a blood vessel, at least one image obtained by correcting the plurality of images, and user input data for correcting the plurality of views. Also, the storage unit (not shown) may store algorithms or programs executed in the medical image processing apparatus 1300.

In addition, the storage unit (not shown) may be implemented as various types of storage media, for example, a flash memory, a hard disk, and an EEPROM. Also, the medical image processing apparatus 1300 may manage a Web storage or a cloud server having a storage function of the storage on the Web.

The medical image processing apparatus 1300 may be implemented as a portable device. Examples of the portable medical image processing apparatus 1300 may include a picture archiving and communication system (PACS) viewer, a smartphone, a laptop computer, a personal digital assistant (PDA), a tablet PC, etc., but are not limited thereto.

The medical image processing apparatus 1300 may simultaneously correct a contour line of the blood vessel area in the plurality of images except the first view image, by correcting the contour line of the blood vessel area in the first view image. The medical image processing apparatus 1300 may reduce a time duration taken to perform an imaging operation, by simultaneously correcting the contour line in the plurality of images.

The medical image processing apparatus 1300 may include a central processor that may control overall operations of the image processor 1310, the display 1320, and the user interface 1330. The central processor may be implemented as an array of a plurality of logic gates, or a combination of a universal micro-processor and a memory storing programs that may be executed in the universal micro-processor. Also, one of ordinary skill in the art would appreciate that the central processor may be implemented as another type of hardware.

Other universal elements, besides the elements shown in FIG. 13, may be further included in the medical image processing apparatus 1300.

Hereinafter, various operations or applications performed by the medical image processing apparatus 1300 will be described. Although none of the image processor 1310, the display 1320, and the user interface 1330 are specified, features and aspects that would be clearly understood by and are obvious to those of ordinary skill in the art may be considered as a typical implementation. The scope of the present inventive concept is not limited by a name of a particular component or physical/logical structure.

Figure 14:
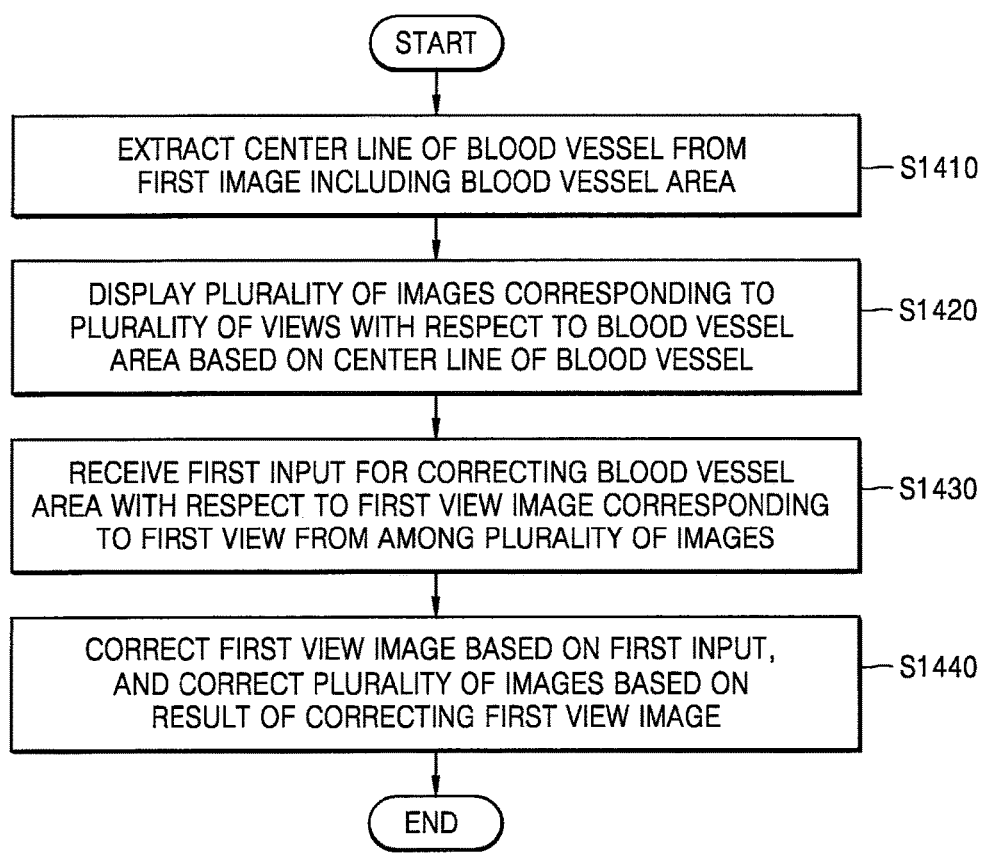
FIG. 14 illustrates a flowchart of a medical image processing method according to an embodiment.

FIG. 14 illustrates a flowchart of a medical image processing method according to an embodiment.

In operation S1410 of FIG. 14, the medical image processing apparatus 1300 extracts a center line of a blood vessel from a first image representing a blood vessel area. The medical image processing apparatus 1300 may segment a lumen and a vessel wall of the blood vessel area in the first image. The medical image processing apparatus 1300 may segment the blood vessel area by extracting the center line of the blood vessel in the first image, before correcting a boundary of the blood vessel.

Here, the first image may denote all kinds of images, in which the blood vessel area is clearly visualized. Also, the first image may be an image in which the blood vessel area is segmented.

In operation 51420, the medical image processing apparatus 1300 may display a plurality of images corresponding to a plurality of views with respect to the blood vessel area, based on the center line of the blood vessel. The medical image processing apparatus 1300 may generate the plurality of images corresponding to the plurality of views based on the center line of the blood vessel.

Here, the plurality of images may be cross-sectional images of the blood vessel including the center line of the blood vessel. Also, the plurality of images may include a first view image, a second view image, etc. In more detail, the first view image may be a CT projection image that is obtained by projecting a 3D CT image corresponding to the first view image from a direction perpendicular to the center line of the blood vessel.

In operation S1430, the medical image processing apparatus 1300 receives a first input for correcting the blood vessel area with respect to the first view image corresponding to the first view, from among the plurality of images. The medical image processing apparatus 1300 may receive the first input for correcting a lumen contour line or a vessel wall contour line of the blood vessel area included in the first view image.

In operation S1440, the medical image processing apparatus 1300 corrects the first view image based on the first input, and corrects the plurality of images based on a result of correcting the first view image. The medical image processing apparatus 1300 may correct at least one image from among the plurality of images, except the first view image, by using at least one of a HU value and a HU gradient of the corrected location in the first view image.

Figure 15:
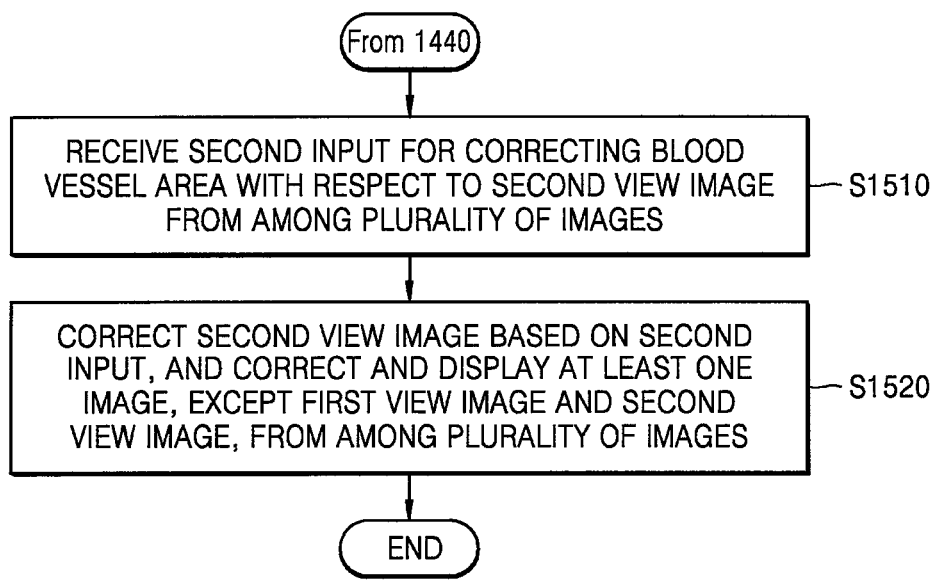
FIG. 15 illustrates a flowchart of a medical image processing method according to an embodiment.

FIG. 15 illustrates a flowchart of a medical image processing method according to another embodiment.

In operation S1510 of FIG. 15, the medical image processing apparatus 1300 receives a second input for correcting a blood vessel area with respect to a second view image from among a plurality of images. The medical image processing apparatus 1300 may receive the second input for correcting a lumen contour line or a vessel wall contour line of the blood vessel area included in the second view image.

In operation S1520, the medical image processing apparatus 1300 corrects the second view image based on the second input, and corrects and displays at least one image from among the plurality of images, except a first view image and the second view image. The medical image processing apparatus 1300 may correct corresponding parts of the images, e.g., a third view image and a fourth view image, based on a result of correcting the second view image. The medical image processing apparatus 1300 may display the plurality of corrected images so that the corrected parts may be distinguished from parts before being corrected. The medical image processing apparatus 1300 finally receives an input for approving the corrected parts, and displays the plurality of corrected images.

Figure 16:
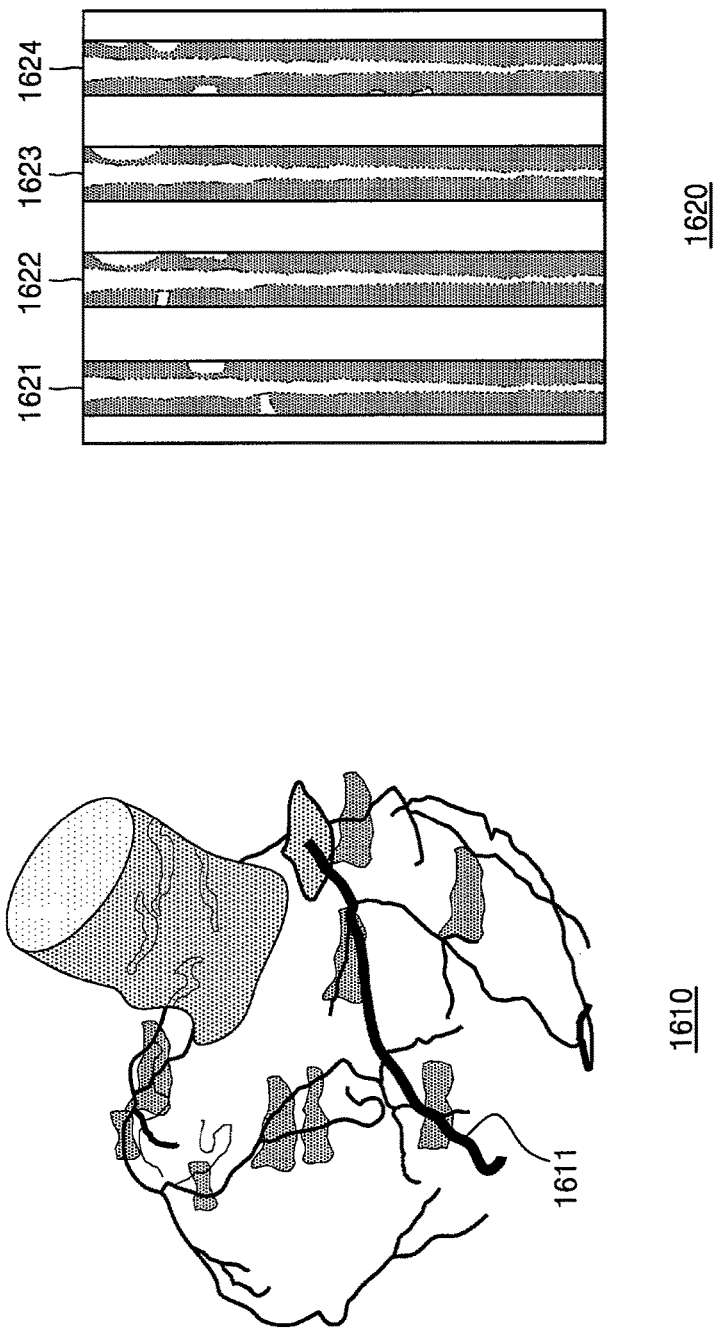
FIG. 16 illustrates a diagram of a CT image capturing an image of a heart and a plurality of curved planar reformation (CPR) views, according to an embodiment.

FIG. 16 illustrates a diagram of a CT image of a heart area and images according to a plurality of CPR views, according to an embodiment.

As shown in an image 1610 of FIG. 16, a heart CT image that is obtained by performing multi-energy CT imaging after injecting a contrast medium into an object is shown. Heart diseases may include arrhythmia, cardiovascular diseases, etc. The cardiovascular disease may include coronary artery stenosis. The coronary artery stenosis may cause a serious disease such as myocardial infarction, arrhythmia, and angina pectoris, and thus, the coronary artery stenosis has to be accurately diagnosed and a strangulated blood vessel has to be expanded. The user analyzes the heart CT image to find a stenosis blood vessel, and measures a degree of stenosis accurately. A reference numeral 1611 denotes a coronary artery in the heart. A contour line of the coronary artery may be used to diagnose the coronary artery stenosis.

As shown in an image 1620 of FIG. 16, the medical image processing apparatus 1300 displays a plurality of images of the heart CT image, in correspondence with a plurality of views. The medical image processing apparatus 1300 extracts a center line of the blood vessel in the heart CT image, and performs segmentation of a lumen contour line and a vessel wall contour line of the blood vessel into four points of view. The medical image processing apparatus 1300 displays four segmented images 1621, 1622, 1623, and 1624. Moreover, the medical image processing apparatus 1300 may show various pieces of additional information on the four segmented images 1621, 1622, 1623, and 1624 as text or graphics. In addition, the four segmented images 1621, 1622, 1623, and 1624 may be stored in a storage unit.

Figure 17:
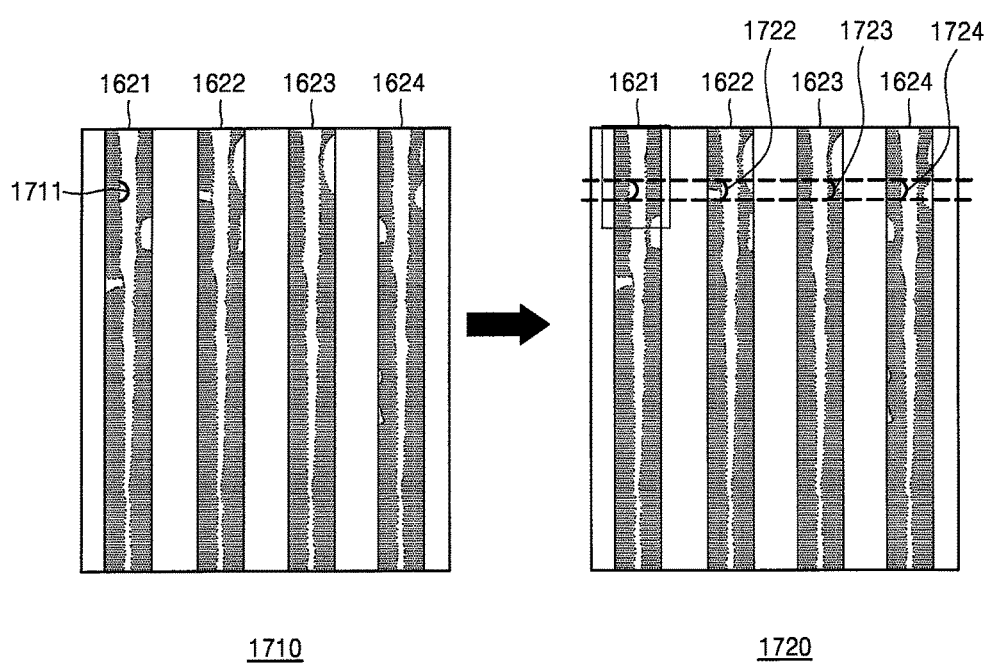
FIG. 17 illustrates a diagram of a process of correcting a boundary of a blood vessel, according to an embodiment.

FIG. 17 illustrates a diagram of a process of correcting a boundary of a blood vessel, according to an embodiment.

As shown in an image 1710 of FIG. 17, the medical image processing apparatus 1300 displays the plurality of images 1621, 1622, 1623, and 1624 corresponding to a plurality of views with respect to the blood vessel, via the display 1320. The medical image processing apparatus 1300 may receive a first input 1711 for correcting a blood vessel area in the first view image 1621 corresponding to the first view, from among the plurality of images 1621, 1622, 1623, and 1624.

As shown in an image 1720 of FIG. 17, the medical image processing apparatus 1300 may correct the first view image 1621, in correspondence with the first input 1711. The medical image processing apparatus 1300 may correct at least one of the images 1622, 1623, and 1624, except the first view image 1621, from among the plurality of images 1621, 1622, 1623, and 1624, based on a result of correcting the first view image 1621 (1722, 1723, and 1724).

In addition, the medical image processing apparatus 1300 may receive a second input for correcting a blood vessel area in a second view image. The medical image processing apparatus 1300 corrects the second view image based on the second input. The medical image processing apparatus 1300 may correct at least one image, except the second view image, from among the plurality of images, based on a result of correcting the second view image. In this case, the medical image processing apparatus 1300 may correct the first view image, or may correct the other images, except the first view image, based on the result of correcting the second view image.

The medical image processing apparatus 1300 may display the first view image that has been corrected based on the first input and the plurality of images that have been corrected based on the second input.

Figure 18:
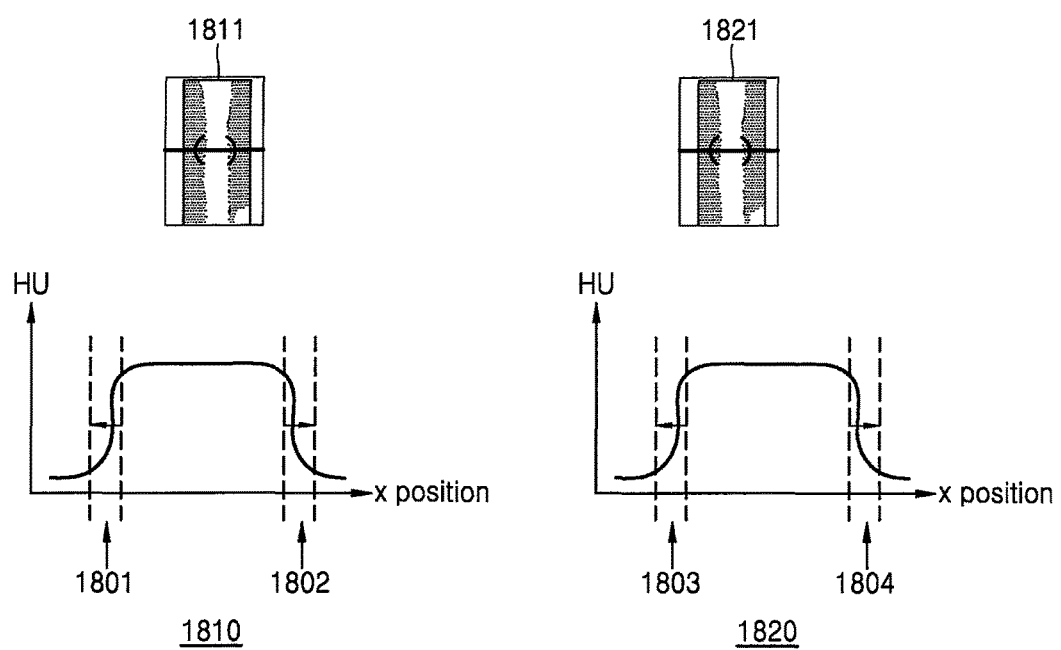
FIG. 18 illustrates a diagram of a process of correcting a boundary of a blood vessel by analyzing a Hounsfield unit (HU) value, according to an embodiment.

FIG. 18 illustrates a diagram of processes of correcting a boundary of a blood vessel by analyzing a HU value, according to an embodiment.

An image 1810 of FIG. 18 is a graph showing a HU value with respect to the first view image 1811, and an image 1820 is a graph showing a HU value with respect to the second view image 1821. The medical image processing apparatus 1300 receives a first input for correcting the blood vessel area, and may correct the first view image based on the first input. The medical image processing apparatus 1300 may analyze the first view image that has been corrected. The medical image processing apparatus 1300 may correct other contour lines in the first view image based on at least one contour line that has been corrected based on the first input.

The medical image processing apparatus 1300 may correct a second view image and a third view image, based on a result of correcting the first view image. The medical image processing apparatus 1300 may correct at least one image, except the first view image, from among a plurality of images, by using at least one of the HU value and a HU gradient that are corrected in the first view image. In more detail, if the HU value is increased in a region 1801, HU values in a region 1802, a region 1803, and a region 1804 may be also increased by the same ratio. As another example, the first view image and the second view image may be corrected so that a gradient at a location with respect to a region having an average HU value in each of the region 1802, the region 1803, and the region 1804 may correspond to a gradient at a location having an average HU value in the region 1801.

The above-described apparatus may be implemented by using a hardware component, a software component, and/or a combination of a hardware component and a software component. For example, the apparatus and the component described in the embodiments may be implemented by using one or more general-purpose computers or a special-purpose computer such as, for example, a processor, a controller, an arithmetic logic unit (ALU), a digital signal processor (DSP), a microcomputer, a field programmable array (FPA), a programmable logic unit (PLU), a microprocessor, or any device that may execute an instruction and respond thereto.

A processor may execute an operating system (OS) and one or more software applications executed on the OS. Also, the processor may access, store, manipulate, process, and generate data in response to execution of software.

For convenience of understanding, though description has been made to the case where one processor is used, a person of ordinary skill in the art will understand that the processor may include a plurality of processing elements and/or processing elements having a plurality of types. For example, the processor may include a plurality of processors, or one processor and one controller. Also, the processor may include a different processing configuration such as a parallel processor.

Software may include a computer program, a code, an instruction, or a combination of one or more of these, and configure the processor to operate as desired, or instruct the processor independently or collectively.

Software and/or data may be embodied permanently or temporarily in a certain type of a machine, a component, a physical device, virtual equipment, a computer storage medium or device, or a transmitted signal wave in order to allow the processor to analyze the software and/or data, or to provide an instruction or data to the processor. Software may be distributed on a computer system connected via a network, and stored and executed in a distributed fashion. Software and data may be stored in one or more non-transitory computer-readable recording media.

The methods according to embodiments may be embodied in the form of program commands executable through various computer means, which may be recorded on a non-transitory computer-readable recording medium. The non-transitory computer-readable recording medium may include program commands, data files, and data structures either alone or in combination. The program commands recorded on the non-transitory computer-readable recording medium may be those that are especially designed and configured for the inventive concept, or may be those that are known and available to computer programmers of ordinary skill in the art.

Examples of the non-transitory computer-readable recording medium include magnetic recording media such as hard disks, floppy disks, and magnetic tapes, optical recording media such as CD-ROMs and DVDs, magneto-optical recording media such as floptical disks, and hardware devices such as ROMs, RAMs, and flash memories that are especially configured to store and execute program commands.

Examples of the program commands include machine language codes that may be generated by a compiler, and high-level language codes that may be executed by a computer by using an interpreter.

The above hardware device may be configured to operate as one or more software modules in order to perform an operation of an embodiment, and vice versa.

Although the embodiments have been described by a limited number of embodiments and drawings, a person of ordinary skill in the art will be capable of making various modifications and changes from the above embodiments. For example, even when the described technologies are performed in an order different from the described method and/or components such as the described system, structure, apparatus, and circuit are coupled or combined in a form different from the described method, or replaced by other components or equivalents thereof, an appropriate result may be accomplished.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A medical image processing apparatus comprising:
a display;
an image processor configured to:
extract a blood vessel area and at least one contour line of the blood vessel area from a first image representing the blood vessel area;
obtain a second image representing an area of at least one plaque based on the blood vessel area and the at least one contour line; and
control the display to display the second image; and
a user interface configured to:
receive an input signal correcting at least one contour line corresponding to at least one of the at least one plaque represented in the second image; and
receive an input signal on a first plaque from among the at least one plaque represented in the second image,
wherein the image processor is further configured to:
correct the second image based on the input signal; and
control, based on receipt of the input signal on the first plaque, the display to display a third image that represents a view of the first plaque according to a criterion set in advance,
wherein the second image is a cross-sectional image corresponding to the view of the first plaque, and
wherein the cross-sectional image corresponding to the view of the first plaque comprises at least one of a cross-sectional image of a normal blood vessel area adjacent to the area of the first plaque, a cross-sectional image in which the area of the first plaque is set to be a maximum depth of the first plaque or a maximum area of the first plaque, or a cross-sectional image adjacent to the cross-sectional image in which the area of the first plaque is set to be the maximum depth or the maximum area.

2. The medical image processing apparatus of claim 1, wherein the image processor is further configured to control the display to display the corrected second image.

3. The medical image processing apparatus of claim 1, wherein the criterion set in advance includes the area of the first plaque is at the maximum depth of the first plaque or at the maximum area of the first plaque.

4. The medical image processing apparatus of claim 1, wherein the third image represents a second view of the first plaque that has moved based on a first view of the first plaque.

5. The medical image processing apparatus of claim 1, wherein when the third image comprises a plurality of images corresponding to the first plaque:
the user interface is further configured to receive a first input signal of a user for correcting the at least one contour line in a first image of the first plaque from among the plurality of images; the image processor is further configured to: correct the first image of the first plaque based on the first input signal of the user; and control the display to display the first image of the first plaque, wherein the first image has been corrected.

6. The medical image processing apparatus of claim 5, wherein the image processor is further configured to correct the plurality of images that are different from the first image of the first plaque based on the first input signal of the user and control the display to display the plurality of images that have been corrected.

7. The medical image processing apparatus of claim 1, wherein the image processor is further configured to obtain the second image representing the area of the at least one plaque by detecting the at least one plaque based on the blood vessel area and the at least one contour line and label the at least one plaque that is detected.

8. The medical image processing apparatus of claim 7, wherein the image processor is further configured to label the at least one plaque that is detected by using at least one of a maximum intensity projection or a minimum intensity projection.

9. The medical image processing apparatus of claim 1, wherein the blood vessel is a coronary artery, and the at least one contour line is a lumen contour line or a vessel wall contour line of the coronary artery.

10. A medical image processing apparatus comprising:
a display;
an image processor configured to:
extract a center line of a blood vessel from a first image representing a blood vessel area;
generate a plurality of images corresponding to a plurality of views with respect to the blood vessel area based on the center line of the blood vessel; and
control the display to display the plurality of images; and
a user interface configured to receive a first input signal for correcting the blood vessel area in a first view image corresponding to a first view, from among the plurality of images,
wherein the image processor is further configured to correct the first view image based on the first input signal, and correct at least one image, except the first view image, from among the plurality of images based on a result of correcting the first view image,
wherein one of the plurality of images is a cross-sectional image representing an area of a first plaque and corresponds to a view of the first plaque, and
wherein the cross-sectional image corresponding to the view of the first plaque comprises at least one of a cross-sectional image of a normal blood vessel area adjacent to the area of the first plaque, a cross-sectional image in which the area of the first plaque is set to be a maximum depth of the first plaque or a maximum area of the first plaque, or a cross-sectional image adjacent to the cross-sectional image in which the area of the first plaque is set to be the maximum depth or the maximum area.

11. The medical image processing apparatus of claim 10, wherein the image processor is further configured to control the display to display the at least one image that has been corrected.

12. The medical image processing apparatus of claim 11, wherein the user interface is further configured to receive a second input signal for correcting the blood vessel area in a second view image from among the plurality of images, and the image processor is further configured to correct the second view image based on the second input signal and correct at least one image, except the first view image and the second view image, from among the plurality of images based on a result of correcting the second view image.

13. The medical image processing apparatus of claim 12, wherein the image processor is further configured to control the display to display the first view image that has been corrected based on the first input signal and the plurality of images that have been corrected based on the second input signal.

14. The medical image processing apparatus of claim 10, wherein the user interface is further configured to receive the first input signal for correcting at least one contour line of the blood vessel area included in the first view image.

15. The medical image processing apparatus of claim 10, wherein the image processor is further configured to correct at least one image, except the first view image, from among the plurality of images by using at least one of a Hounsfield unit (HU) value and a HU gradient at a location that has been corrected in the first view image.

16. The medical image processing apparatus of claim 10, wherein the image processor is further configured to control the display to display a corrected part to be distinguished from a part before being corrected in each of the plurality of images.

17. The medical image processing apparatus of claim 16, wherein the user interface is further configured to receive at least one of an input signal for approving the corrected part and an input signal for correcting the corrected part, wherein the image processor is further configured to control the display to display the plurality of images, to which at least one of the input signal for approving the corrected part and the input signal for correcting the corrected part is applied.

* * * * *